United States Patent
Fushiya et al.

(10) Patent No.: US 12,360,015 B2
(45) Date of Patent: Jul. 15, 2025

(54) SAMPLE REMOVAL APPARATUS AND TESTING SYSTEM

(71) Applicant: KONICA MINOLTA, INC., Tokyo (JP)

(72) Inventors: Kengo Fushiya, Machida (JP); Takahiro Hara, Tama (JP); Hiroshi Morimoto, Akiruno (JP)

(73) Assignee: KONICA MINOLTA, INC., Tokyo (JP)

( * ) Notice: Subject to any disclaimer, the term of this patent is extended or adjusted under 35 U.S.C. 154(b) by 265 days.

(21) Appl. No.: 17/943,285

(22) Filed: Sep. 13, 2022

(65) Prior Publication Data

US 2023/0110801 A1   Apr. 13, 2023

(30) Foreign Application Priority Data

Oct. 7, 2021   (JP) .................................. 2021-165262

(51) Int. Cl.
*G01N 1/02*   (2006.01)

(52) U.S. Cl.
CPC .......... *G01N 1/02* (2013.01); *G01N 2001/028* (2013.01)

(58) Field of Classification Search
CPC ................................. G01N 1/02; G01N 35/04
See application file for complete search history.

(56) References Cited

U.S. PATENT DOCUMENTS

| | | | |
|---|---|---|---|
| 8,430,321 B2* | 4/2013 | Tokunaga | G01N 35/00712 235/487 |
| 8,852,506 B2* | 10/2014 | Hamada | G01N 35/00663 422/63 |
| 11,994,527 B2* | 5/2024 | Kawamoto | G01N 35/025 |
| 12,031,995 B2* | 7/2024 | Hiroki | G01N 35/1079 |
| 2011/0290890 A1 | 12/2011 | Tokunaga et al. | |
| 2020/0174031 A1* | 6/2020 | Fujii | G01N 35/00732 |
| 2020/0355712 A1* | 11/2020 | Kawamoto | G01N 35/04 |
| 2022/0323951 A1* | 10/2022 | Fushiya | B01L 3/502 |
| 2023/0390766 A1* | 12/2023 | Hayashi | G01N 35/00 |

FOREIGN PATENT DOCUMENTS

| | | |
|---|---|---|
| JP | H08228759 A | 9/1996 |
| JP | 2011252735 A | 12/2011 |

* cited by examiner

*Primary Examiner* — John Fitzgerald
(74) *Attorney, Agent, or Firm* — Buchanan Ingersoll & Rooney PC

(57) ABSTRACT

An extraction apparatus is a sample removal apparatus that removes a sample collected from a living body. The extraction apparatus includes: a storage container holder that holds a storage container of a sample and is capable of being placed at a sample receiving section where the sample is supplied to the storage container, and a removal section that causes the sample to be discharged from the storage container to a predetermined place; a housing that covers the storage container holder and the removal section; and a supply section that allows for supply of the sample from the outside of the housing to the storage container in the housing.

26 Claims, 15 Drawing Sheets

SAMPLE REMOVAL APPARATUS AND TESTING SYSTEM

CROSS-REFERENCE TO RELATED APPLICATION

Japanese patent application No. 2021-165262 filed on Oct. 7, 2021, including description, claims, drawings, and abstract the entire disclosure is incorporated herein by reference in its entirety.

BACKGROUND

1. Technological Field

The present invention relates to a sample removal apparatus and a testing system.

2. Description of the Related Art

Testing for detecting a virus or the like from a sample is performed, for example, as follows. First, a tester such as a doctor and a nurse collects a sample such as saliva or nasal swabs from the pharynx, nasal cavity, or the like of a subject using a cotton swab or the like. Subsequently, the sample is extracted by immersing the cotton swab or the like to which the sample is attached in an extractant. Thereafter, the sample extracted into the extractant is dropped onto a predetermined place to react with a reagent, whereby a test is performed.

In such a testing field, automation is in progress (Refer to Unexamined Japanese Patent Publication No. 2011-252732 and Unexamined Japanese Patent Publication No. H8-228759).

SUMMARY

In such testing, automation is in progress as described above. However, there is a problem in that it is difficult to perform the test with high accuracy and safety in a case where the test is performed by a tester who is inexperienced in handling the sample, because a certain degree of experience and skill is required in a testing process such as extraction of the sample. In particular, it is difficult for an unskilled tester to handle a storage container for storing the sample, and contamination of the storage container is likely to occur.

The present invention has been made in view of the above circumstances, and an object of the present invention is to provide a sample removal apparatus and a testing system capable of reducing contamination of a storage container.

To achieve at least one of the abovementioned objects, according to an aspect of the present invention, a sample removal apparatus removing a sample stored in a storage container reflecting one aspect of the present invention comprises a storage container holder that holds said storage container; a removal section that removes said sample stored in said storage container from said storage container; a housing that covers said storage container holder and said removal section; and a supply section that allows for supply of said sample from outside of said housing to said storage container in said housing.

The objects, features, and characteristics of this invention other than those set forth above will become apparent from the description given herein below with reference to preferred embodiments illustrated in the accompanying drawings.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

FIG. 3 is a perspective view illustrating a configuration example of a holder illustrated in FIG. 1 and the like;

FIG. 16A is a side view illustrating a configuration of a side surface of a detector illustrated in FIG. 14 and the like;

FIG. 16B is a plan view illustrating a configuration of an upper surface of the detector illustrated in FIG. 16A;

DETAILED DESCRIPTION OF EMBODIMENTS

Figure 1:
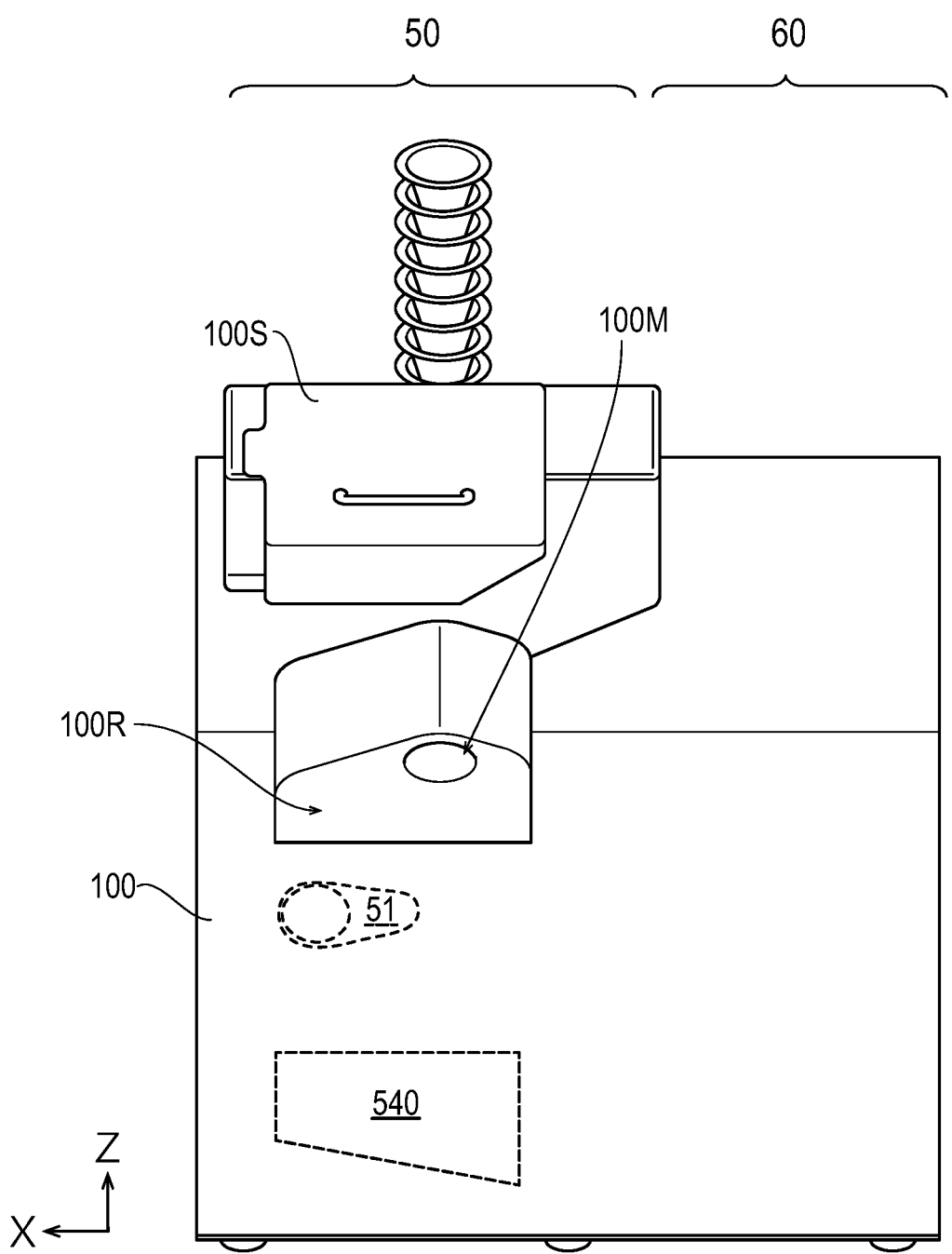
FIG. 1 is a perspective view illustrating an example of an overall configuration of a testing system according to an embodiment.

Hereinafter, one or more embodiments of the present invention will be described with reference to the drawings. However, the scope of the invention is not limited to the disclosed embodiments.

Hereinafter, embodiments of a sample removal apparatus and a testing system of the present invention will be described with reference to the accompanying drawings. Note that the same members in the drawings are denoted by the same reference numerals. In addition, dimensional ratios in the drawings are exaggerated for convenience of description, and may be different from actual ratios.

EMBODIMENTS

<Overall Configuration of Testing System>

FIG. 1 illustrates an example of an overall configuration of a testing system 1 according to an embodiment of the present invention. The testing system 1 includes an extraction apparatus 50 and a testing apparatus 60 provided in a housing 100. For example, the extraction apparatus 50 is provided on one side (the left side in the sheet of the drawing) in the housing 100, and the testing apparatus 60 is provided on the other side (the right side in the sheet of the drawing). Hereinafter, an arrangement direction of the extraction apparatus 50 and the testing apparatus 60 is referred to as a left-right direction or an X direction, and a direction perpendicular to a ground contact surface (ground) of the testing system 1 is referred to as a vertical direction or a Z direction.

The housing 100 has a recess 100R, for example, in its upper left, and a supply section 100M is provided on a bottom surface of the recess 100R. The supply section 100M is an opening provided in the housing 100. The testing system 1 includes a shield 100S capable of shielding the supply section 100M. The shield 100S is formed of, for example, a plate-like member capable of shielding the recess 100R where the supply section 100M is provided, and its one end is fixed to the housing 100. The shield 100S is configured to be turnable about the end fixed to the housing 100 as an axis, for example. The shield 100S may slide to shield the supply section 100M. Since the testing system 1 includes the shield 100S, it is possible to prevent inflow of contaminants from the supply section 100M into the testing system 1.

The extraction apparatus 50 provided in the housing 100 mainly plays a role of extracting a biological sample (hereinafter, the biological sample is simply referred to as a sample) of a subject attached to a collection tool (e.g., a collection tool C in FIG. 4 described later) such as a cotton swab with an extractant, and removing the extracted sample to a predetermined place. In the testing apparatus 60, for example, the sample and a reagent are mixed at a place where the sample is supplied, and a test is performed. Here, the extraction apparatus 50 corresponds to a specific example of a sample removal apparatus of the present invention.

<Configuration of Extraction Apparatus>

Figure 2:
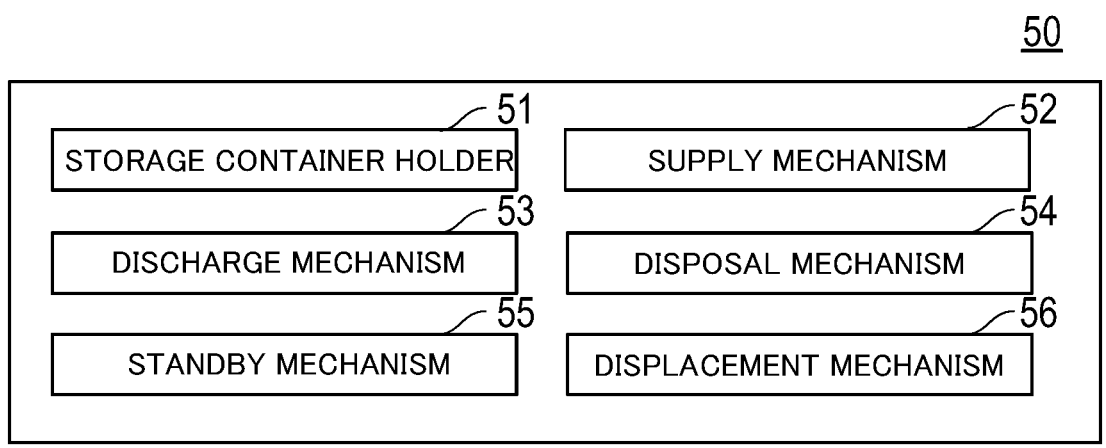
FIG. 2 is a block diagram illustrating a configuration example of an extraction apparatus illustrated in FIG. 1.

FIG. 2 is a block diagram illustrating a configuration example of the extraction apparatus 50. The extraction apparatus 50 includes, for example, a storage container holder 51, a supply mechanism 52, a discharge mechanism 53, a disposal mechanism 54, a standby mechanism 55, and a displacement mechanism 56.

Figure 3:
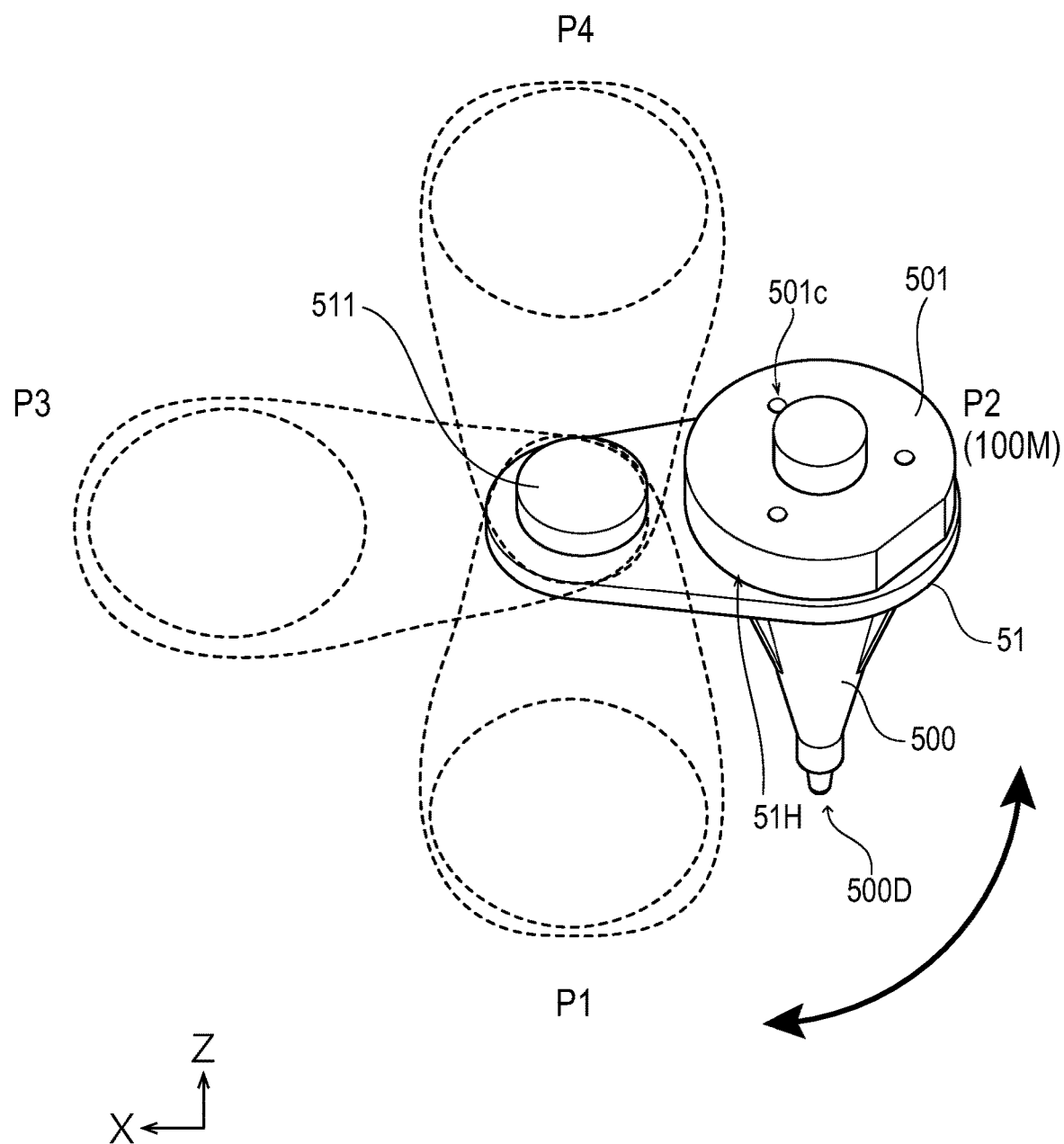

FIG. 3 illustrates a configuration example of the storage container holder 51. The storage container holder 51 holds a storage container 500 in which the sample is stored. The storage container holder 51 has, for example, one circular hole 51H into which the conical storage container 500 is fitted, and the storage container 500 is held by inserting the storage container 500 into the hole 51H. The storage container holder 51 holds only one storage container 500, so that the extraction apparatus 50 and, eventually, the testing system 1 can be downsized, and the degree of freedom of an installation place of the testing system 1 can be improved. The storage container holder 51 is covered with the housing 100 (FIG. 1). The sample is supplied from the outside of the housing 100 to the storage container 500 in the housing 100 through the supply section 100M provided in the housing 100.

The storage container holder 51 has, for example, a substantially elliptical planar shape, one end of which is supported by a support 511 and the other end of which is provided with the hole 51H. The support 511 turnably supports the storage container holder 51. The support 511 is formed of, for example, a shaft-shaped member and is configured to be axially rotatable. When the support 511 axially rotates, the storage container holder 51 rotates about its one end, and the hole 51H is displaced. The storage container holder 51 rotates, for example, clockwise and counterclockwise. As the storage container holder 51 rotates, the hole 51H (the storage container 500) is displaced to a sample receiving section P1, a removal section P2, a disposal preparation section P3, and an installation section P4. The sample receiving section P1, the removal section P2, the disposal preparation section P3, and the installation section P4 are arranged in a circular shape, for example, and are arranged counterclockwise in the order of the sample receiving section P1, the removal section P2, the installation section P4, and the disposal preparation section P3. By arranging the sample receiving section P1, the removal section P2, the disposal preparation section P3, and the installation section P4 in a circular shape, the extraction apparatus 50 can be easily downsized. The sample receiving section P1, the removal section P2, the disposal preparation section P3, and the installation section P4 are covered with the housing 100. The supply section 100M is provided at a position corresponding to the storage container 500 placed at the sample receiving section P1.

Figure 4:
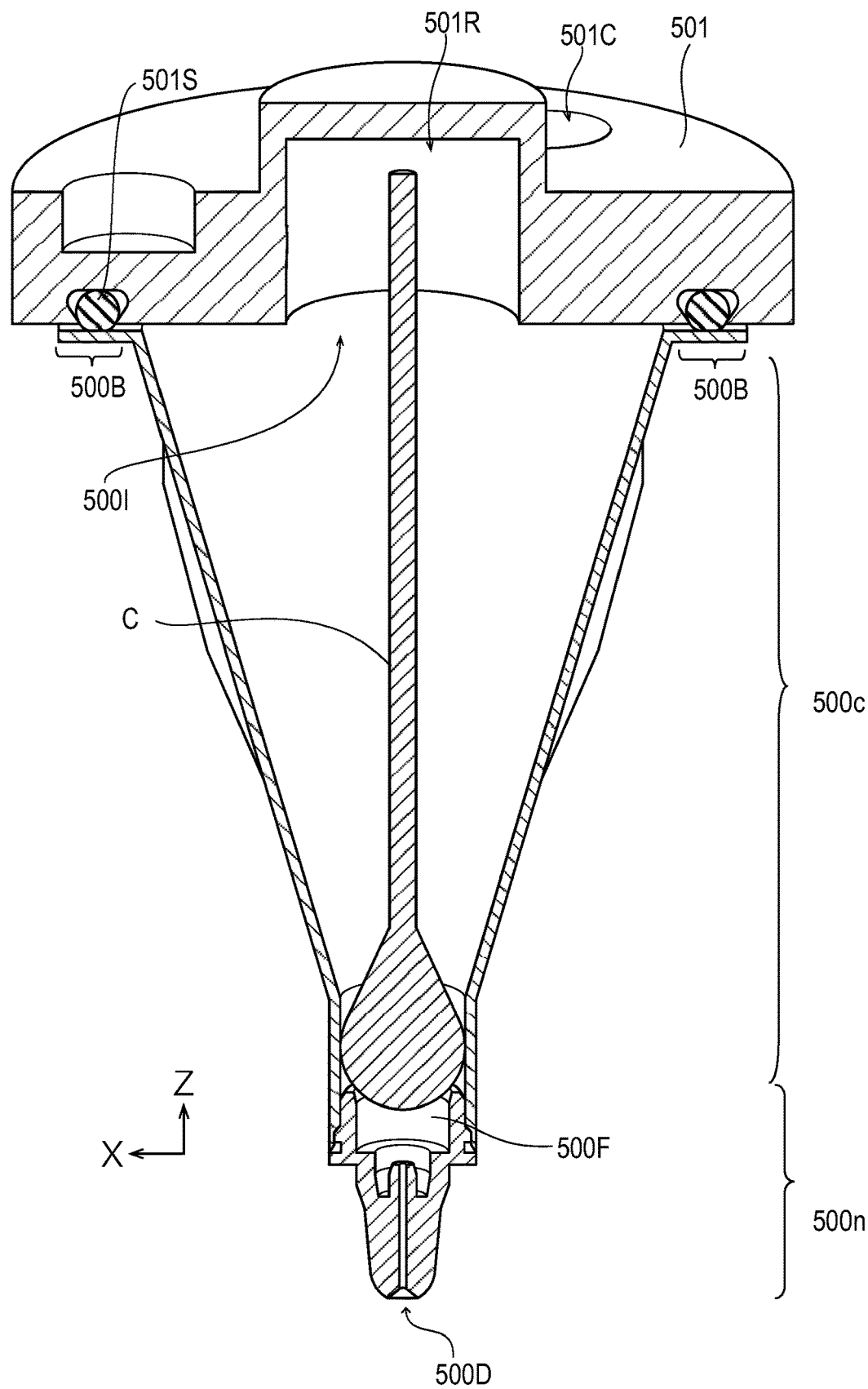
FIG. 4 is a cross-sectional view illustrating a configuration example of a storage container illustrated in FIG. 3.

FIG. 4 illustrates an example of a cross-sectional configuration of the storage container 500 held by the storage container holder 51. The storage container 500 has, for example, a nozzle portion 500n and a storage portion 500c. The storage container 500 is preferably disposable, for example, and is used by being replaced every time to every several times, for example.

The storage portion 500c has a size, for example, capable of storing the collection tool C such as a cotton swab, and has an insertion port 500I. The insertion port 500I is provided, for example, on the bottom surface side of the conical storage container 500. The collection tool C to which the sample is attached is inserted from the insertion port 500I. The storage portion 500c stores a predetermined amount of extractant together with the collection tool C. The sample attached to the collection tool C is extracted or dispersed in the extractant in the storage portion 500c.

The storage container 500 has, for example, a flange 500B provided along the peripheral edge of the insertion port 500I. The flange 500B is a portion protruding in an eaves shape from the insertion port 500I. That is, the storage container 500 has the flange 500B outside the insertion port 500I. The size of the hole 51H of the storage container holder 51 is, for example, larger than the diameter of the insertion port 500I and smaller than the diameter of the flange 500B. As a result, as the flange 500B is provided with a larger width than the hole 51H, the storage container 500 is held by the storage container holder 51.

The nozzle portion 500n is provided, for example, on the apex side of the conical storage container 500, and has a discharge port 500D. The sample extracted into the extractant in the storage portion 500c is discharged from the discharge port 500D to a predetermined place.

The nozzle portion 500n is provided with, for example, a filter 500F. The sample and the extractant that have passed through the filter 500F are discharged from the discharge port 500D. In other words, the sample and the extractant flowing toward the discharge port 500D pass through the filter 500F, and solid impurities, viscous impurities, and the like contained in the sample are cleared by the filter 500F. By providing the filter 500F as described above in the storage container 500, it is possible to suppress occurrence of a trouble such as clogging of the discharge port 500D. The filter 500F is made of, for example, an organic material, an inorganic material, or the like. Examples of the organic material include polyethylene, polypropylene, a fluorine-based resin, and a nylon resin.

At the removal section P2, the insertion port 500I of the storage container 500 is covered with a lid 501 (see FIGS. 3 and 4). For example, the lid 501 is held above the storage container holder 51, and is lowered to a position in contact with the flange 500B of the storage container 500 when the storage container holder 51 is placed at the removal section P2.

The lid 501 has, for example, a substantially circular planar shape. When the insertion port 500I is closed by the lid 501, the storage container 500 is sealed. The lid 501 is configured to be detachable from the insertion port 500I, and the insertion port 500I of the storage container 500 is opened at the sample receiving section P1, the disposal preparation section P3, and the installation section P4. The lid 501 is provided with, for example, a recess 501R, a sealing structure 501S, and a connection hole 501C.

The recess 501R is placed, for example, around the center of the lid 501, and is provided on one main surface of the lid 501. At the removal section P2, the insertion port 500I is closed such that the surface where the recess 501R is provided faces the storage container 500. For example, a part of the collection tool C in the storage container 500 is inserted into the recess 501R. By providing the recess 501R as described above in the lid 501, the storage container 500 can be downsized.

The sealing structure 501S is provided, for example, on the same surface as the surface where the recess 501R is provided. The sealing structure 501S plays a role of bringing the flange 500B of the storage container 500 and the lid 501 into close contact with each other. The sealing structure 501S is formed of an O-ring provided at a position corresponding to the flange 500B.

The connection hole 501C is provided to penetrate the lid 501 from one main surface to the other main surface. The connection hole 501C is connected to a discharge accelerator (a discharge accelerator 531 in FIG. 6 described later). A fluid such as air flows into the storage container 500 from the discharge accelerator through the connection hole 501C, and the sample and the extractant are discharged from the discharge port 500D.

The storage container 500 may be made of a single material or may be made of a plurality of materials. The storage container 500 is made of for example, a resin material. By using the resin material, the storage container 500 with suppressed cost and suitable for disposable use can be configured. Examples of the resin constituting the storage container 500 include polyethylene, polypropylene, polystyrene, polyvinyl chloride, polycarbonate, polyester, polymethyl methacrylate, polyvinyl acetate, a vinyl-acetate copolymer, a styrene-methyl methacrylate copolymer, an acrylonitrile-styrene copolymer, an acrylonitrile-butadiene-styrene copolymer, nylon, polymethylpentene, a silicone resin, an amino resin, polysulfone, polyethersulfone, polyetherimide, a fluororesin, and polyimide.

The collection tool C inserted into the storage container 500 is formed of, for example, a cotton swab or the like. The collection tool C is preferably disposable, and is preferably easily incinerated. By easily incinerating the collection tool C, it is possible to suppress occurrence of infection via the collection tool C. The shaft of the cotton swab is made of, for example, resin, paper, wood, metal, or the like, and the cotton ball is made of absorbent cotton, fiber, resin, or the like. The shaft of the cotton swab is preferably made of resin or paper. As a result, the cotton swab can be easily used in a disposable manner and easily incinerated. The cotton ball may have an uneven structure. By providing the cotton ball with the uneven structure, the sample is easily held in the uneven structure, and the sample can be more reliably attached to the collection tool C.

With the collection tool C as described above, the sample is collected from, for example, a mucosal portion such as the nasal cavity, oral cavity, or the like of the subject. The sample is, for example, a body fluid collected from the mucosal portion, and specifically, is nasal swabs, saliva, and the like. The sample may be a body fluid collected from a body-fluid wet portion such as a wound. The sample may be collected directly or indirectly from the subject. The indirectly collected sample is, for example, a sample collected from a door knob or the like touched by the subject. The sample is preferably collected non-invasively from the subject. For example, DNA, RNA, protein, virus, bacteria, or the like contained in the sample reacts with the reagent to perform the test. The extractant is a liquid capable of extracting the sample collected from the subject with the collection tool C, and is, for example, water or the like.

Figure 5:
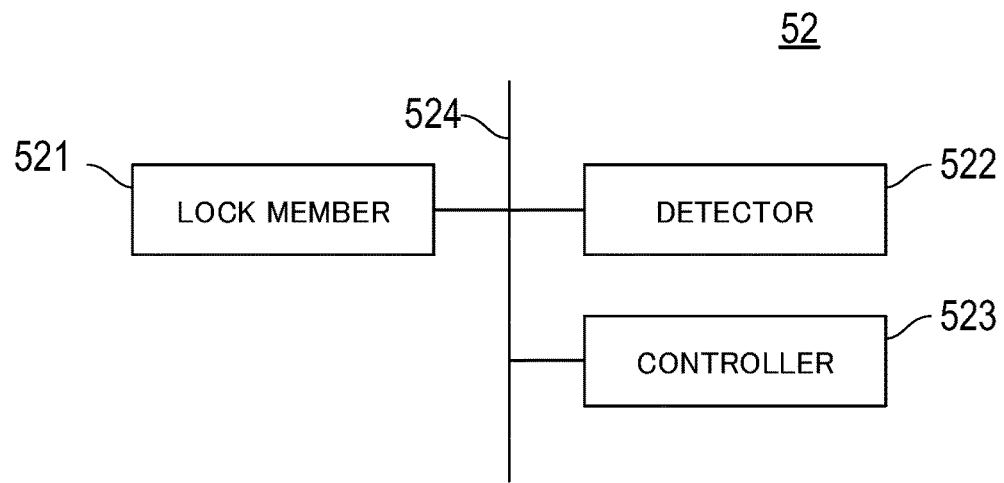
FIG. 5 is a block diagram illustrating a configuration example of a supply mechanism illustrated in FIG. 2.

FIG. 5 illustrates a configuration example of the supply mechanism 52. The supply mechanism 52 is a mechanism that causes, for example, a tester to supply the collection tool C to which the sample is attached, to the storage container 500 placed at the sample receiving section P1. The supply mechanism 52 includes, for example, a lock member 521, a detector 522, and a controller 523. The lock member 521, the detector 522, and the controller 523 are connected to each other via, for example, a bus 524.

The lock member 521 fixes the shield 100S at a position to shield the supply section 100M. In other words, the shield 100S is configured to be lockable (can be locked) in a state of shielding the supply section 100M. The lock member 521 may mechanically lock or electrically lock the shield 100S.

The detector 522 is, for example, a sensor that detects that the storage container holder 51 is set at a position close to the supply section 100M, that is, at the sample receiving section P1. When detecting that the storage container holder 51 is set at the sample receiving section P1, the detector 522 transmits first detection information to the controller 523. The detector 522 is, for example, a photosensor or the like placed near the sample receiving section P1. The detector 522 may be a sensor that detects shielding and exposure of the supply section 100M, that is, opening and closing of the shield 100S. When detecting the exposure and shielding of the supply section 100M in this order, the detector 522 transmits shielding information to the controller 523. Here, the detector 522 corresponds to a specific example of first and second detectors of the present invention.

The controller 523 includes one or a plurality of CPUs (Central Processing Units), and executes various processes in accordance with a computer program. The controller 523 releases the lock member 521 on the basis of the first detection information transmitted from the detector 522. As a result, the shield 100S is unlocked, and the tester can move the shield 100S. When the detector 522 detects that the storage container holder 51 moves away from the sample receiving section P1, for example, the controller 523 drives the lock member 521 to lock the shield 100S. The controller 523 may cause a display to display, for example, a screen for accepting a next instruction from the tester on the basis of the shielding information transmitted from the detector 522.

Figure 6:
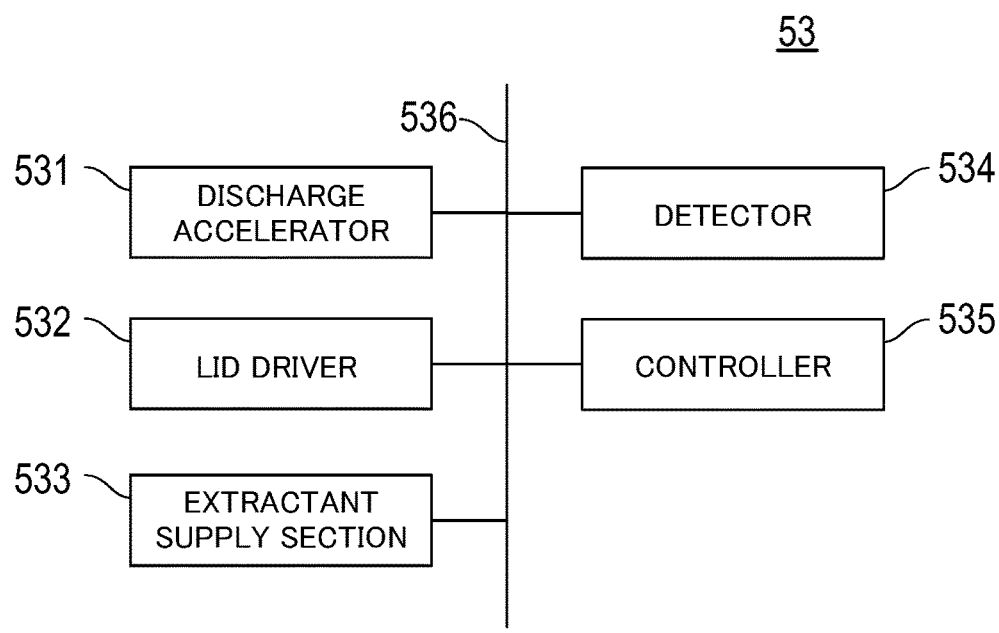
FIG. 6 is a block diagram illustrating a configuration example of a discharge mechanism illustrated in FIG. 2.

FIG. 6 illustrates a configuration example of the discharge mechanism 53. The discharge mechanism 53 is a mechanism for removing the sample from the storage container 500 placed at the removal section P2. More specifically, after supplying the extractant to the storage container 500, the discharge mechanism 53 causes the sample extracted into the extractant to be discharged to a predetermined place. The discharge mechanism 53 causes the sample to be discharged to below the storage container holder 51. The discharge mechanism 53 includes, for example, a discharge accelerator 531, a lid driver 532, an extractant supply section 533, a detector 534, and a controller 535. The discharge accelerator 531, the lid driver 532, the extractant supply section 533, the detector 534, and the controller 535 are connected to each other via, for example, a bus 536.

The discharge accelerator 531 plays a role of causing the sample extracted into the extractant in the storage container 500 to be discharged from the discharge port 500D. For example, the discharge accelerator 531 includes a pressurizer connected to the connection hole 501C of the lid 501 via a coupler or the like, and causes a gaseous body such as air to flow into the storage container 500 sealed by the lid 501 in response to an instruction from the controller 535. As a result, the pressure inside the storage container 500 increases, and the sample extracted into the extractant is discharged from the discharge port 500D. For example, the discharge amount can be adjusted by controlling the amount of gaseous body flowing into the storage container 500. The discharge accelerator 531 may raise the pressure inside the storage container 500 by causing a liquid to flow into the storage container 500.

The discharge accelerator 531 may include, for example, a heater that heats the storage container 500, and may raise the pressure inside the storage container 500 by heating the storage container 500. By heating the storage container 500, the air in the storage container 500 expands, or the extractant vaporizes, so that the pressure inside the storage container 500 increases. As a result, the sample extracted into the extractant is discharged from the discharge port 500D of the storage container 500.

Alternatively, the discharge accelerator 531 may include a pressing member such as a roller that presses the storage container 500 from the outside. By pressing the storage container 500 from the outside, the volume inside the storage container 500 decreases, and the pressure inside the storage container 500 increases. As a result, the sample extracted into the extractant is discharged from the discharge port 500D of the storage container 500.

The discharge accelerator 531 may include a suction section that applies a suction force to the discharge port 500D. The discharge accelerator 531 including the suction section applies a suction force to the discharge port 500D by setting the vicinity of the discharge port 500D to a negative pressure in response to an instruction from the controller 535. As a result, the sample extracted into the extractant is discharged from the discharge port 500D according to the applied suction force.

The discharge accelerator 531 may include a vibrator that vibrates the storage container 500. The discharge accelerator 531 including the vibrator vibrates the storage container 500 in response to an instruction from the controller 535. As a result, the pressure inside the storage container 500 changes, and the sample extracted into the extractant is discharged from the discharge port 500D.

The lid driver 532 includes, for example, an ascending and descending member that holds the lid 501, and a driver that vertically moves the ascending and descending member. The lid 501 is held by the ascending and descending member, for example, above the removal section P2. The lid driver 532 lowers the ascending and descending member in response to an instruction from the controller 535. As a result, the insertion port 500I of the storage container 500 placed at the removal section P2 is covered with the lid 501, and the storage container 500 is sealed.

The extractant supply section 533 includes, for example, an extractant reservoir and an extractant carrier that carries the extractant from the extractant reservoir into the storage container 500. The extractant reservoir is, for example, a container or the like that stores the extractant such as water. The extractant carrier includes, for example, a pump, a pipe, and the like. The extractant supply section 533 supplies the extractant from the extractant reservoir into the storage container 500 in response to an instruction from the controller 535. As a result, the sample attached to the collection tool C is extracted into the extractant in the storage container 500 placed at the removal section P2.

The detector 534 is a sensor that detects that the storage container holder 51 is set at the removal section P2. When detecting that the storage container holder 51 is set at the removal section P2, the detector 534 transmits second detection information to the controller 535. The detector 534 is, for example, a photosensor or the like placed near the removal section P2. The detector 534 may include a sensor that detects the sealed state of the storage container 500.

The controller 535 includes one or a plurality of CPUs, and executes various processes in accordance with a computer program. Based on the second detection information transmitted from the detector 534, the controller 535 first transmits an instruction to the extractant supply section 533 to supply the extractant into the storage container 500. After a predetermined amount of extractant is supplied to the storage container 500, the controller 535 transmits an instruction to the lid driver 532 to lower the ascending and descending member holding the lid 501. After the storage container 500 is sealed by the lid 501, the controller 535 instructs the discharge accelerator 531 to perform discharge from the discharge port 500D. In response to the instruction from the controller 535, for example, the discharge accelerator 531 pressurizes the inside of the storage container 500, to cause the sample extracted into the extractant to be discharged from the discharge port 500D of the storage container 500.

Figure 7:
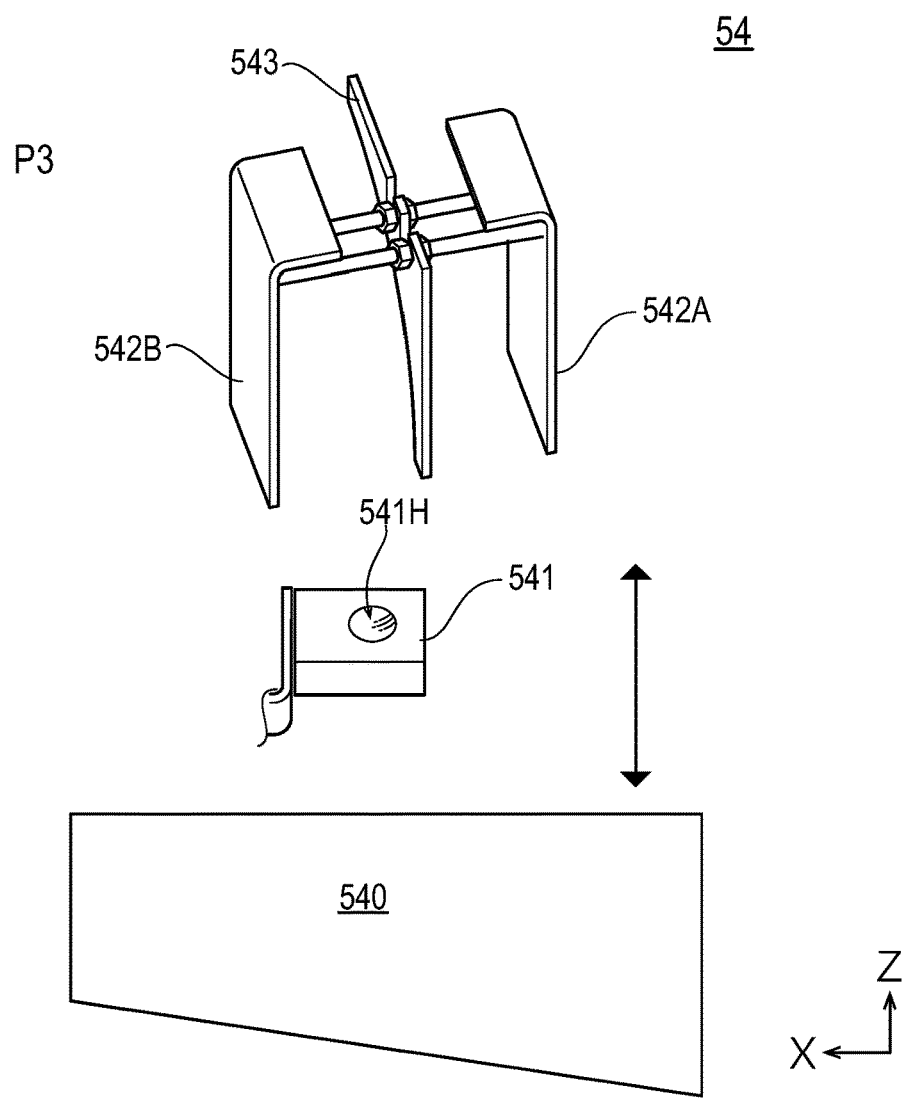
FIG. 7 is a perspective view illustrating a configuration example of a disposal preparation section illustrated in FIG. 3.
Figure 8:
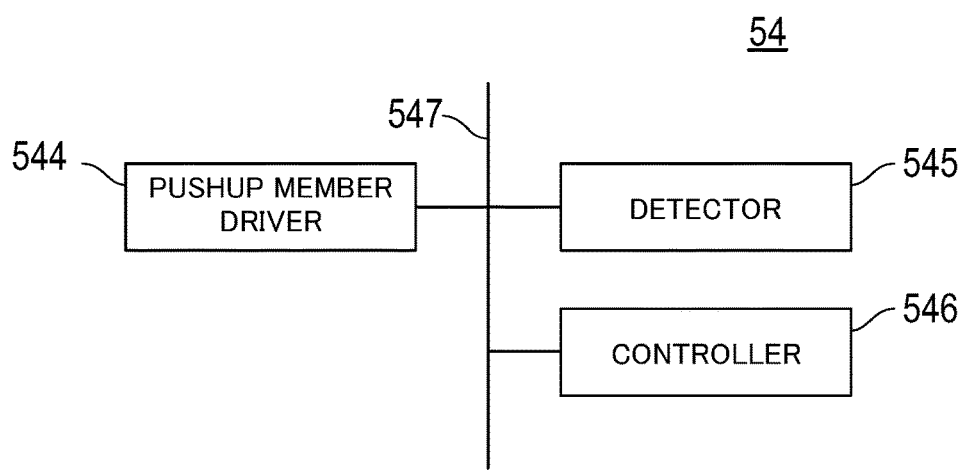
FIG. 8 is a block diagram illustrating a configuration example of a disposal mechanism illustrated in FIG. 2.

FIGS. 7 and 8 illustrate a configuration example of the disposal mechanism 54. The disposal mechanism 54 includes, for example, a disposal section 540, a pushup member 541, support members 542A and 542B, and a guide member 543 provided at the disposal preparation section P3 (FIG. 7). The disposal mechanism 54 further includes a pushup member driver 544, a detector 545, and a controller 546. The pushup member driver 544, the detector 545, and the controller 546 are connected to each other via, for example, a bus 547 (FIG. 8).

The disposal section 540 is a space for collecting the storage container 500 after the sample is discharged, that is, a space for collecting the used storage container 500, and is placed below the storage container holder 51 (FIG. 1). A bottom surface of the disposal section 540 preferably has an inclination. As a result, the storage container 500 after disposal rolls, and the storage container 500 can be easily collected.

The pushup member 541 is placed at a position below the storage container holder 51 placed at the disposal preparation section P3, and is configured to be movable in the vertical direction. The pushup member 541 is, for example, a plate-like member having a quadrangular planar shape, and a hole 541H is provided in the center of the pushup member 541. The hole 541H has, for example, a substantially circular shape, and has a size into which the vicinity of the apex of the conical storage container 500 is fitted. When the storage container holder 51 is placed at the disposal preparation section P3, the pushup member 541 rises, and the vicinity of the apex of the storage container 500 (a lower part of the storage container 500) is fitted into the hole 541H.

The support members 542A and 542B are placed at positions above the storage container holder 51 placed at the disposal preparation section P3. That is, when the storage container holder 51 is placed at the disposal preparation section P3, the pushup member 541, the storage container holder 51, and the support members 542A and 542B are arranged in this order from the bottom in the disposal preparation section P3. The support members 542A and 542B are, for example, a pair of plate-like members, and face each other with the guide member 543 interposed therebetween. The support members 542A and 542B play a role of supporting the storage container 500 that rises together with the pushup member 541. For example, the flange 500B of the storage container 500 is brought into contact with the support members 542A and 542B, so that the storage container 500 is supported.

Similarly to the support members 542A and 542B, the guide member 543 is placed at a position above the storage container holder 51 placed at the disposal preparation section P3. The used storage container 500 is guided to the disposal section 540 by the guide member 543.

Figure 9:
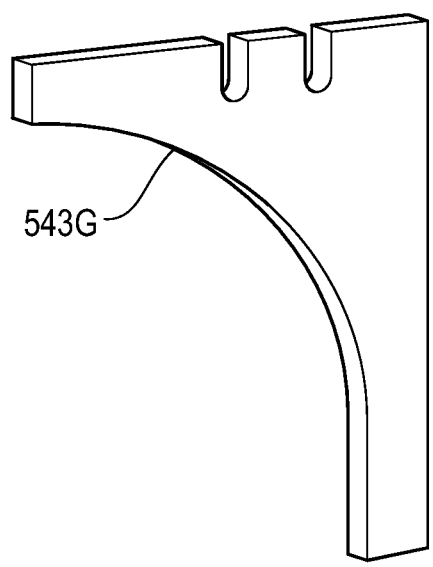
FIG. 9 is a perspective view illustrating a configuration example of a guide illustrated in FIG. 7.

FIG. 9 is a perspective view of the guide member 543 illustrated in FIG. 7. The guide member 543 includes a guide 543G. The guide 543G is configured by, for example, an arc-shaped recessed surface. The flange 500B of the storage container 500 rising together with the pushup member 541 moves while being in contact with the guide 543G, so that the storage container 500 falls into the disposal section 540.

The pushup member driver 544 includes a driver that vertically moves the pushup member 541. The pushup member driver 544 lifts the pushup member 541 in response to an instruction from the controller 546. As a result, the vicinity of the apex of the storage container 500 placed at the disposal preparation section P3 is fitted into the hole 541H of the pushup member 541.

The detector 545 is a sensor that detects that the storage container holder 51 is set at the disposal preparation section P3. When detecting that the storage container holder 51 is set at the disposal preparation section P3, the detector 545 transmits third detection information to the controller 546. The detector 545 is, for example, a photosensor or the like placed near the disposal preparation section P3.

The controller 546 includes one or a plurality of CPUs, and executes various processes in accordance with a computer program. Based on the third detection information transmitted from the detector 545, the controller 546 transmits an instruction to the pushup member driver 544 to lift the pushup member 541. As a result, the used storage container 500 rising together with the pushup member 541 is guided to the disposal section 540.

Figure 10:
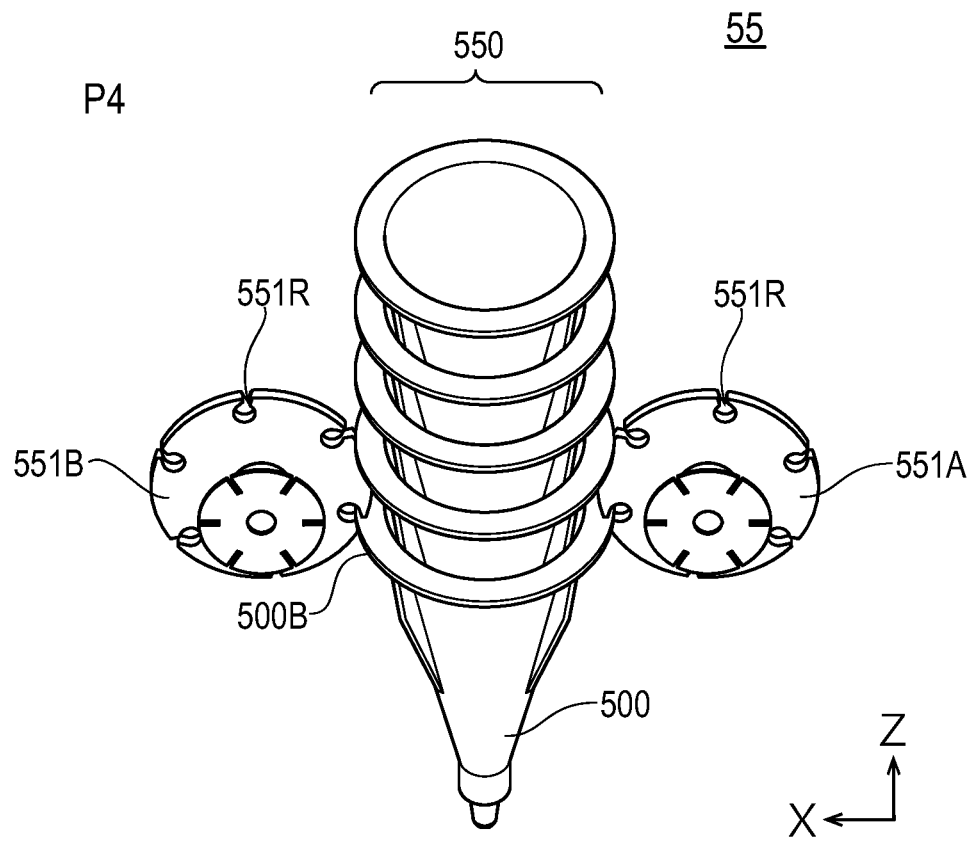
FIG. 10 is a perspective view illustrating a configuration example of an installation section illustrated in FIG. 3.
Figure 11:
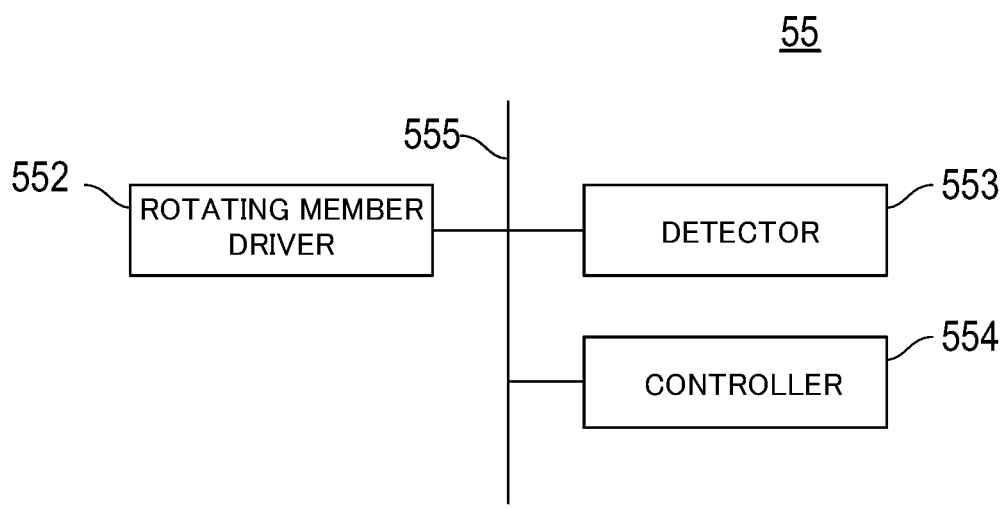
FIG. 11 is a block diagram illustrating a configuration example of a standby mechanism illustrated in FIG. 2.

FIGS. 10 and 11 illustrate a configuration example of the standby mechanism 55. The standby mechanism 55 includes, for example, a standby section 550 and rotating members 551A and 551B provided at the installation section P4 (FIG. 10). The standby mechanism 55 further includes a rotating member driver 552, a detector 553, and a controller 554. The rotating member driver 552, the detector 553, and the controller 554 are connected to each other via, for example, a bus 555 (FIG. 11).

The standby section 550 is a standby space for the storage container 500 before the sample is supplied, that is, a standby space for the empty storage container 500 before use, and is provided at a position above the storage container holder 51 placed at the installation section P4. The standby section 550 is provided between the pair of rotating members 551A and 551B. In the standby section 550, for example, a plurality of the storage containers 500 are provided to be stacked up.

The pair of rotating members 551A and 551B has, for example, a substantially circular planar shape and is configured to be rotatable in this plane. For example, the rotating member 551A rotates counterclockwise, and the rotating member 551B rotates clockwise. Each of the rotating members 551A and 551B has a plurality of recesses 551R provided along its circumference. When the flange 500B of the storage container 500 is fitted into the respective recesses 551R of the rotating members 551A and 551B, the storage container 500 is held at the standby section 550. For example, another storage container 500 is inserted into the insertion port 500I of the storage container 500 held by the rotating members 551A and 551B, so that the plurality of storage containers 500 are held at the standby section 550.

The rotating member driver 552 includes a driver that rotates the rotating members 551A and 551B. The rotating member driver 552 rotates the rotating members 551A and 551B in response to an instruction from the controller 554. As a result, the flange 500B fitted in the recesses 551R of the rotating members 551A and 551B is repelled, and the storage container 500 held by the rotating members 551A and 551B falls. At this time, the flange 500B of another storage container 500 is fitted into the recesses 551R to be held between the rotating members 551A and 551B.

The detector 553 is a sensor that detects that the storage container holder 51 is set at the installation section P4. When detecting that the storage container holder 51 is set at the installation section P4, the detector 553 transmits fourth detection information to the controller 554. The detector 553 is, for example, a photosensor or the like placed near the installation section P4.

The controller 554 includes one or a plurality of CPUs, and executes various processes in accordance with a computer program. Based on the fourth detection information transmitted from the detector 553, the controller 554 transmits an instruction to the rotating member driver 552 to rotate the rotating members 551A and 551B. As a result, the empty storage container 500 falls from the standby section 550 to the storage container holder 51. As the flange 500B of the fallen storage container 500 has a larger width than the hole 51H, the storage container 500 is held by the storage container holder 51.

Figure 12:
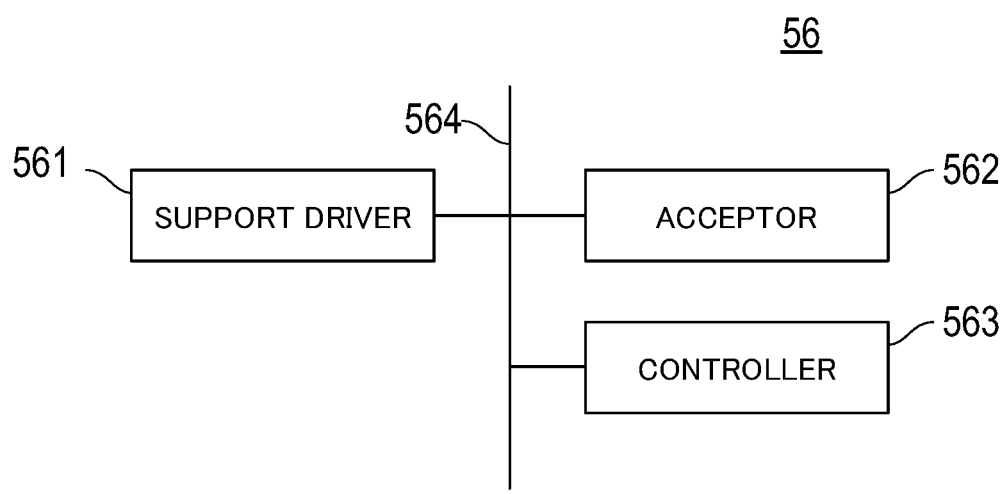
FIG. 12 is a block diagram illustrating a configuration example of a displacement mechanism illustrated in FIG. 2.

FIG. 12 illustrates a configuration example of the displacement mechanism 56. The displacement mechanism 56 includes, for example, a support driver 561, an acceptor 562, and a controller 563. The support driver 561, the acceptor 562, and the controller 563 are connected to each other via, for example, a bus 564.

The support driver 561 includes a driver that axially rotates the support 511. The support driver 561 axially rotates the support 511 in response to an instruction from the controller 563. As a result, the storage container holder 51 supported by the support 511 rotates to be displaced among the sample receiving section P1, the removal section P2, the disposal preparation section P3, and the installation section P4.

The acceptor 562 is formed of, for example, a touch panel or the like that accepts an instruction from the tester. For example, the tester inputs an instruction to advance each process to the acceptor 562. When accepting the instruction of the tester, the acceptor 562 transmits instruction information to the controller 563.

The controller 563 includes one or a plurality of CPUs, and executes various processes in accordance with a computer program. Based on the instruction information transmitted from the acceptor 562, the controller 563 transmits an instruction to the support driver 561 to displace the storage container holder 51. For example, when an instruction to start the test is accepted from the tester, the storage container holder 51 is displaced from the disposal preparation section P3 to the installation section P4. When the instruction to start the test is accepted from the tester, the storage container holder 51 may be displaced from the installation section P4 to the sample receiving section P1.

<Operation of Extraction Apparatus 50>

Figure 13:
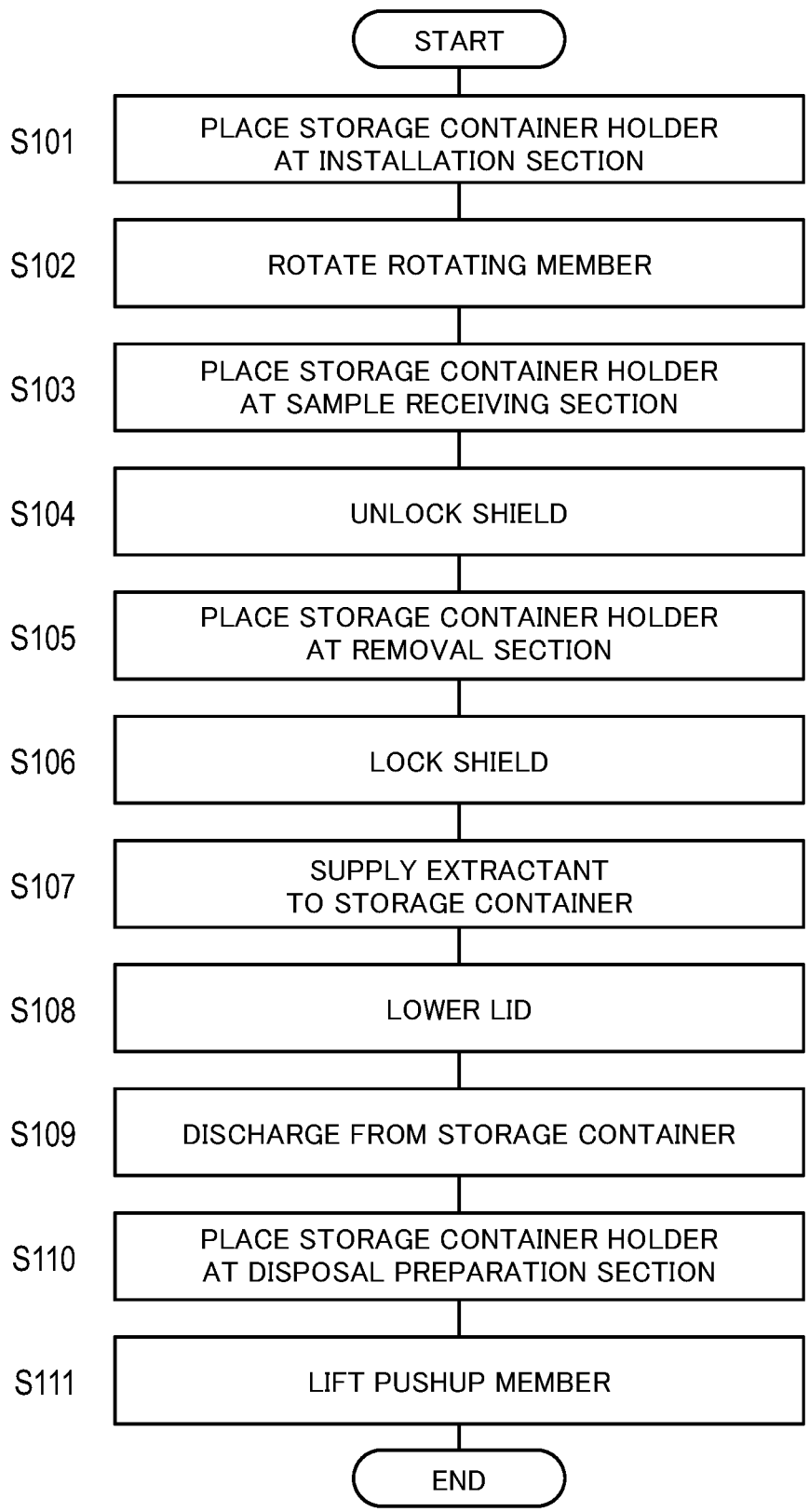
FIG. 13 is a flowchart illustrating an operation example of the extraction apparatus illustrated in FIG. 2.

FIG. 13 is a flowchart illustrating an example of an operation flow of the extraction apparatus 50. The extraction apparatus 50 operates as follows, for example.

First, when the acceptor 562 accepts an instruction to start the test from the tester, the displacement mechanism 56 places the storage container holder 51 at the installation section P4 (step S101). Subsequently, the standby mechanism 55 rotates the rotating members 551A and 551B (step S102). As a result, the empty storage container 500 falls from the standby section 550 into the hole 51H to be held by the storage container holder 51.

Next, when the acceptor 562 accepts an instruction from the tester, the displacement mechanism 56 places the storage container holder 51 at the sample receiving section P1 (step S103). The supply mechanism 52 then unlocks the shield 100S (step S104). As a result, the tester can move the shield 100S to expose the supply section 100M. The tester inserts the collection tool C to which the sample is attached into the storage container 500 through the supply section 100M. Thereafter, the tester moves the shield 100S to shield the supply section 100M.

Next, when the acceptor 562 accepts an instruction from the tester, the displacement mechanism 56 places the storage container holder 51 at the removal section P2 (step S105). At this time, the supply mechanism 52 locks the shield 100S (step S106). The supply mechanism 52 may lock the shield 100S before the storage container holder 51 is placed at the removal section P2.

Next, the discharge mechanism 53 supplies the extractant to the storage container 500 placed at the removal section P2 (step S107). Thereafter, the discharge mechanism 53 lowers the lid 501 (step S108). The storage container 500 is thereby sealed. The discharge mechanism 53 then causes air to flow into the sealed storage container 500, for example. As a result, the sample extracted into the extractant is discharged from the discharge port 500D of the storage container 500 to a predetermined place (step S109). The sample discharged from the discharge port 500D is mixed with, for example, the reagent at the predetermined place.

Next, when the acceptor 562 accepts an instruction from the tester, the displacement mechanism 56 places the storage container holder 51 at the disposal preparation section P3 (step S110). Thereafter, the disposal mechanism 54 lifts the pushup member 541 (step S111). As a result, the vicinity of the apex of the storage container 500 is fitted into the hole 541H of the pushup member 541, and the storage container 500 rising together with the pushup member 541 is guided to the disposal section 540 by the guide member 543. The extraction apparatus 50 operates in this manner, for example.

<Function and Effects of Extraction Apparatus 50>

In the extraction apparatus 50 of the present embodiment, the supply section 100M that allows for supply of the sample from the outside of the housing 100 to the storage container 500 in the housing 100 is provided. More specifically, the supply section 100M is provided at a position corresponding to the insertion port 500I of the storage container 500 placed at the sample receiving section P1. As a result, the tester can supply the sample from the outside of the housing 100 to the storage container 500 without touching the storage container 500. Therefore, it is possible to reduce contamination of the storage container 500 caused when a tester inexperienced in handling the sample touches the storage container 500.

In addition, in the extraction apparatus 50, since the sample is discharged from the storage container 500 at the removal section P2, it is not necessary to operate a pipette or the like, and the biological sample extracted into the extractant can be removed to a predetermined place with less operation. Therefore, even the tester who is inexperienced in handling the sample can easily remove the sample.

Moreover, the storage container holder 51 is configured to be placeable at the disposal preparation section P3 as well, and the extraction apparatus 50 is provided with the disposal mechanism 54. Thus, at the disposal preparation section P3, the used storage container 500 held by the storage container holder 51 is guided to the disposal section 540. As a result, the tester can dispose of the storage container 500 without touching the used storage container 500. Therefore, it is possible to reduce infection risk caused when the tester inexperienced in handling the sample touches the used storage container 500.

Furthermore, the extraction apparatus 50 includes the supply mechanism 52, the discharge mechanism 53, the disposal mechanism 54, the standby mechanism 55, and the displacement mechanism 56. This allows for installation of the empty storage container 500 in the storage container holder 51, supply of the sample to the storage container 500, discharge of the sample from the storage container 500, and disposal of the used storage container 500 without the tester touching the storage container 500. Therefore, even the tester who is inexperienced in handling the sample can perform the test with high accuracy and safety.

<Configuration of Testing Apparatus 60>

Figure 14:
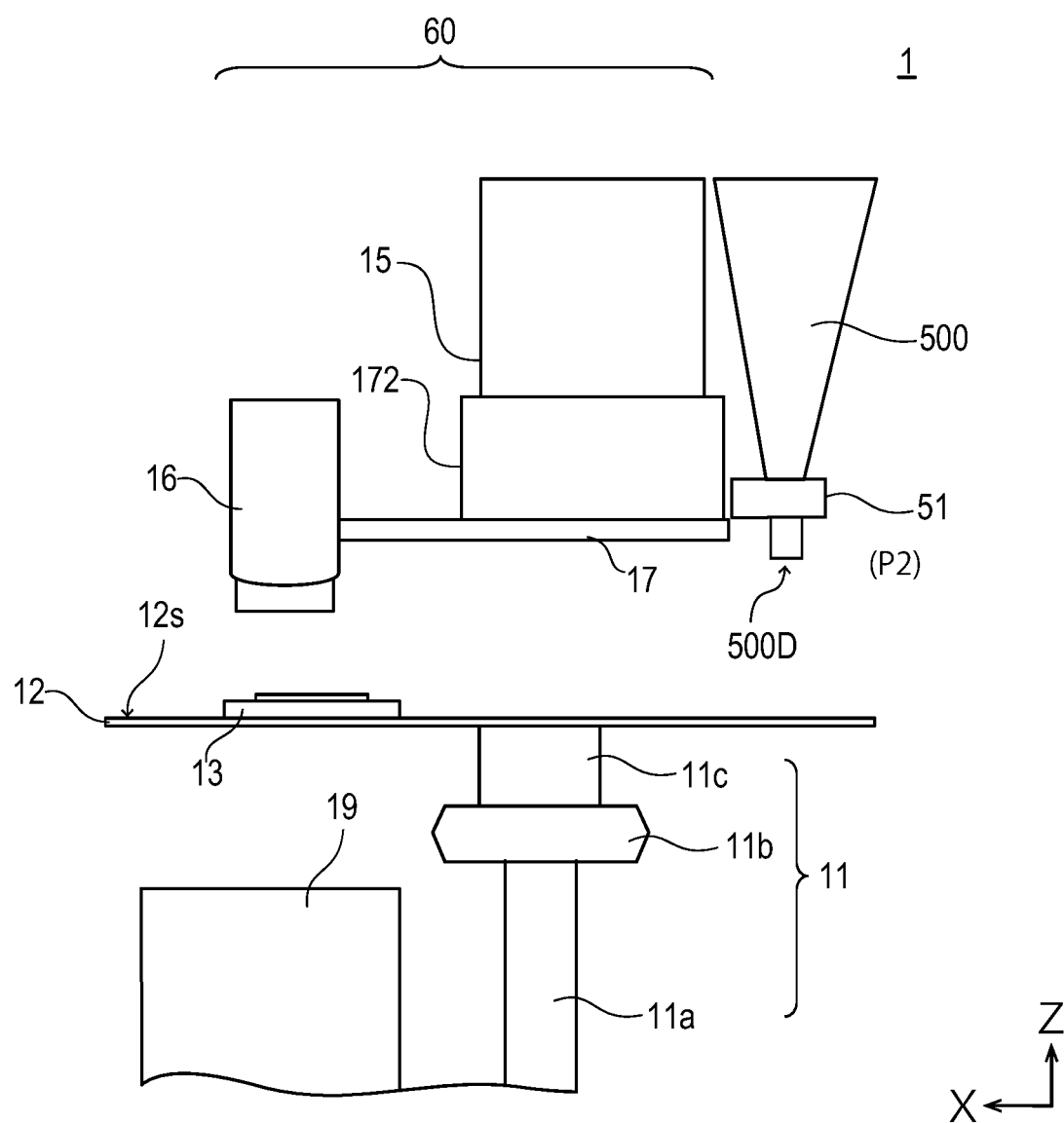
FIG. 14 is a side view illustrating a schematic configuration of a side surface of a testing apparatus illustrated in FIG. 1.
Figure 15:
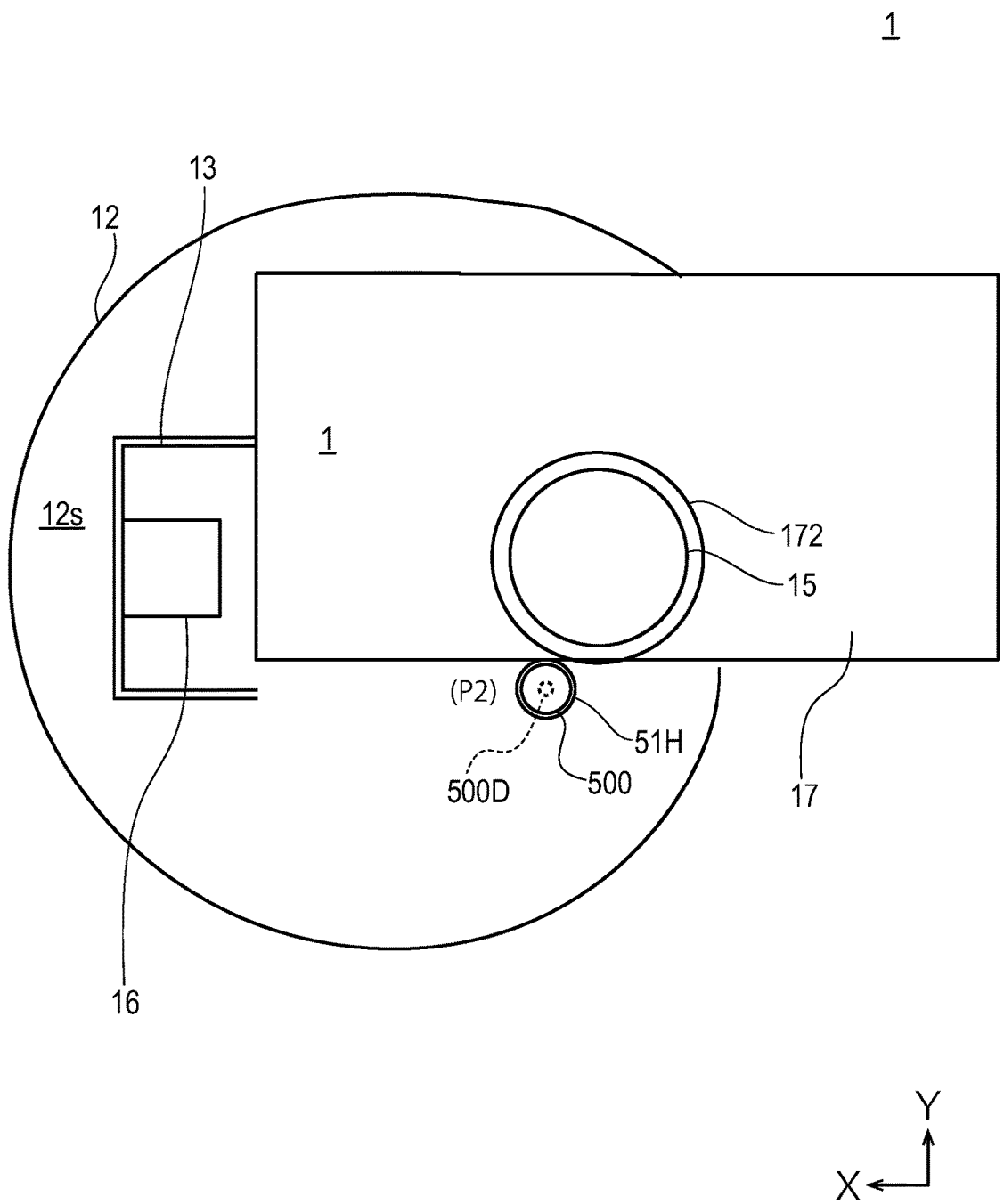
FIG. 15 is a plan view illustrating a configuration of an upper surface of the testing apparatus illustrated in FIG. 14.

FIGS. 14 and 15 illustrate a schematic configuration of the testing apparatus 60. FIG. 14 illustrates a configuration of a side surface (XZ plane) of the testing apparatus 60, and FIG. 15 illustrates a configuration of an upper surface (XY plane) of the testing apparatus 60.

The testing apparatus 60 is an apparatus that performs optical measurement of a mixture of the sample and the reagent. The testing apparatus 60 includes a shaft 11, a support base 12, a detector 13, a reagent supply section 15, an optical measurement section 16, a holding base 17, and a waste liquid reservoir 19.

In the testing system 1, the support base 12 and the detector 13 are provided in this order on the shaft 11. The holding base 17 is placed above the support base 12, and the reagent supply section 15 and the optical measurement section 16 are held by the holding base 17. The waste liquid reservoir 19 is placed below the support base 12. An extractant reservoir of the extraction apparatus 50 may be held by the holding base 17.

The shaft 11 includes a rotating shaft 11a, a connector 11b, and a rotating shaft 11c sequentially from the bottom. For example, the rotating shaft 11a is connected to a motor (not illustrated) to axially rotate. The connector 11b coaxially connects the rotating shaft 11c with the rotating shaft 11a. The rotating shaft 11c axially rotates along with the rotation of the rotating shaft 11a.

The support base 12 provided on the rotating shaft 11c has a rotating surface 12s (XY plane) substantially perpendicular to the rotating shafts 11a and 11c. The rotating surface 12s has, for example, a circular planar shape (FIG. 15). The support base 12 is a so-called turntable, and the rotating surface 12s rotates clockwise or counterclockwise in the XY plane along with the rotation of the rotating shafts 11a and 11c. The detector 13 is provided on the rotating surface 12s, and the detector 13 is displaced along with the rotation of the rotating surface 12s. For example, the single detector 13 is provided on the rotating surface 12s. A plurality of the detectors 13 may be provided on the rotating surface 12s. The removal section P2 of the extraction apparatus 50 is placed at a position facing the support base 12.

To the detector 13 supported by the support base 12, the reagent is supplied from the reagent supply section 15, and the sample is supplied from the storage container 500. The detector 13 to which the reagent and the sample are supplied is irradiated with light from the optical measurement section 16.

Figures 16A, 16B:
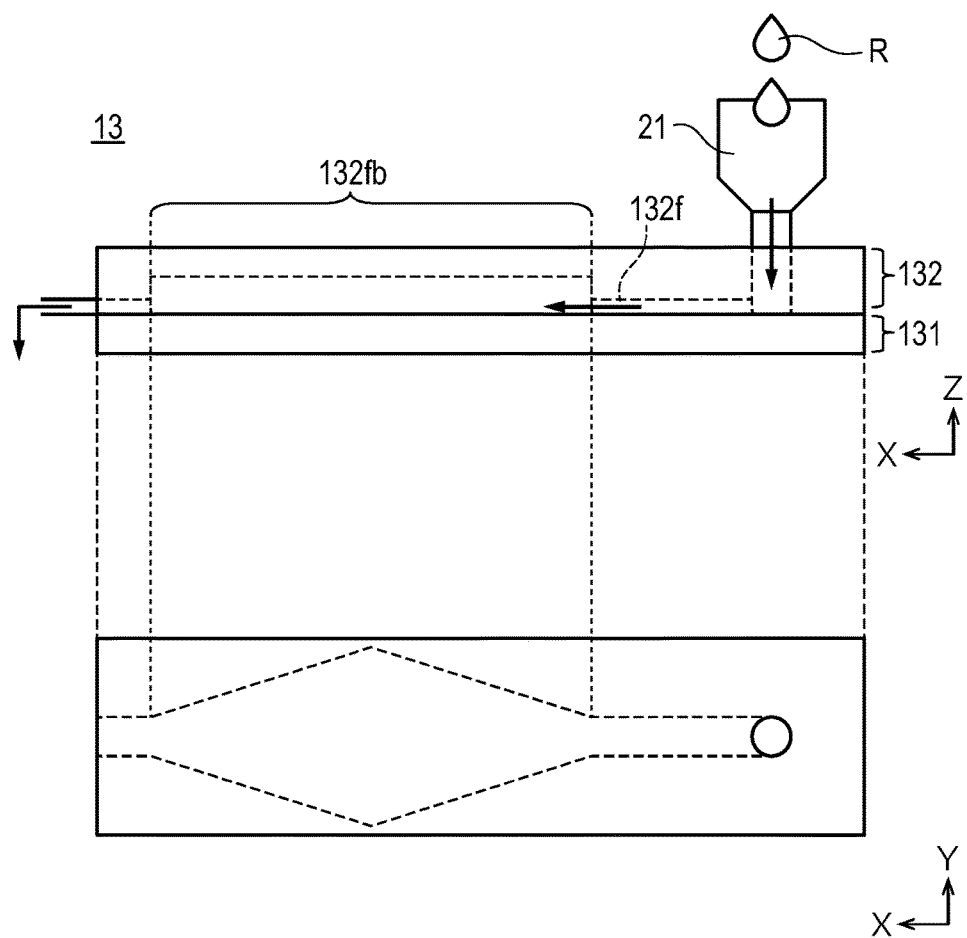

FIGS. 16A and 16B illustrate a configuration example of the detector 13. FIG. 16A illustrates a configuration of a side surface (XZ plane) of the detector 13, and FIG. 16B illustrates a configuration of an upper surface (XY plane) of the detector 13. For example, the detector 13 has a laminated structure of an opaque member 131 and a transparent member 132 sequentially from the rotating surface 12s. For example, a receiving section 21 is provided on the detector 13.

The opaque member 131 is, for example, a plate-like member having a rectangular planar shape. The opaque member 131 is made of a material having a low transmittance for light emitted from the optical measurement section 16. The opaque member 131 includes, for example, a single crystal silicon (Si) material, a resin material, or the like.

The transparent member 132 is laminated on the opaque member 131, and has, for example, substantially the same planar shape as the opaque member 131. The transparent member 132 is provided with a flow path 132f through which a liquid containing the reagent and the sample flows. The flow path 132f allows the liquid containing the reagent and the sample to flow, for example, along a long side direction of the transparent member 132. The flow path 132f has a widened portion 132fb having a larger width than the width of the flow path 132f in another portion. The widened portion 132fb is provided, for example, at the center of the flow path 132f. For example, the sample and the reagent stored in the widened portion 132fb are irradiated with light from the optical measurement section 16, and the optical characteristics are measured. In the flow path 132f, a surface closer to the optical measurement section 16 may be opened.

The transparent member 132 is made of a material having a high transmittance for light emitted from the optical measurement section 16, and the light emitted from the optical measurement section 16 reaches the widened portion 132fb. The transparent member 132 includes, for example, a glass material, a resin material, or the like. The glass material included in the transparent member 132 is, for example, silica glass or the like, and high light transmittance can be achieved by forming the transparent member 132 using such a glass material. The resin material included in the transparent member 132 is, for example, dimethylpolysiloxane, polystyrene, polycarbonate, cycloolefin, acryl, and the like. Dimethylpolysiloxane has high transferability to a mold, and can easily form the transparent member 132. By using polystyrene, polycarbonate, cycloolefin, and acryl, the transparent member 132 can be mass-produced by injection molding. In addition, by forming the transparent member 132 using polystyrene and cycloolefin having less autofluorescence, noise in the optical measurement can be reduced. By forming the transparent member 132 using polycarbonate having a high refractive index, the testing system 1 can be downsized. By forming the transparent member 132 using acryl having high light transmittance, attenuation of light at the time of guiding light can be suppressed, and the accuracy of the optical measurement can be improved. A light incident surface of the transparent member 132 is preferably optically smooth. As a result, the measurement accuracy by the optical measurement section 16 can be improved. The thickness of the transparent member 132 is not particularly limited, and can be adjusted in consideration of rigidity, light transmittance, and the like.

A receiving part 21 on the transparent member 132 plays a role of receiving the sample supplied from the storage container 500 and the reagent supplied from the reagent supply section 15 above the detector 13 and causing the sample and the reagent to flow into the flow path 132f of the detector 13 (more specifically, the transparent member 132). The receiving part 21 has, for example, a funnel shape, and one opening of the receiving part 21 is widened as the distance from the transparent member 132 increases. The other opening of the receiving part 21 communicates with the flow path 132f. For example, the sample and the reagent are mixed in the receiving part 21 and then caused to flow into the flow path 132f. For example, a vibrating mechanism is brought into contact with the outside of the receiving part 21 to vibrate the receiving part 21, so that the sample and the reagent are mixed in the receiving part 21. Alternatively, the sample and the reagent may be mixed in the flow path 132f. For example, by sucking the inside of the flow path 132f from one end and pumping the flow path 132f, the gaseous body and the liquid in the flow path 132f move, and the sample and the reagent are mixed in the flow path 132f.

The reagent supply section 15 is held by the holding base 17. The reagent supply section 15 stores a predetermined amount of reagent, and the reagent stored in the reagent supply section 15 is supplied to the detector 13. In the reagent supply section 15, for example, the reagent dispersed or dissolved in a solvent is stored. The reagent supply section 15 has, for example, a substantially cylindrical shape, and a discharge port 15d is provided at its lower end. The discharge port 15d is placed at a position facing the rotating surface 12s, for example. The reagent stored in the reagent supply section 15 is supplied to the detector 13 through the discharge port 15d. Although FIG. illustrates an example in which the testing system 1 includes the two reagent supply sections 15, the testing system 1 may include one reagent supply section 15 or may include three or more reagent supply sections 15.

The reagent stored in the reagent supply section 15 is, for example, a dye, a fluorescent substance, nanoparticles, and the like, and forms a physical or chemical bond with a detection target substance contained in the sample. As this reagent, a known reagent can be used. The fluorescent substance is, for example, a fluorescent dye, a quantum dot, or the like. The nanoparticles are polystyrene beads, gold nanoparticles, or the like. For example, by bonding such a reagent to the detection target substance, an optical signal generated at the time of light irradiation is increased, and the detection target substance is easily detected. Such a reagent is effective particularly when the optical signal of the detection target substance alone is weak. The reagent may be a substance that causes light absorption or light scattering. At this time, by bonding the reagent to the detection target substance, light intensity generated at the time of light irradiation is reduced, and the optical signal is amplified.

The bond between the reagent and the detection target substance is, for example, a bond by physical adsorption, a bond by antigen-antibody reaction, a bond by DNA hybridization, a biotin-avidin bond, a chelate bond, an amino bond, or the like. The bond by physical adsorption is, for example, a hydrogen bond using an electrostatic bonding force, or the like. In the bond by physical adsorption, pretreatment of the sample or the like is unnecessary, and a conjugate of the reagent and the detection target substance can be easily generated. The bond by antigen-antibody reaction is, for example, a specific bond between the detection target substance such as a virus and the reagent, and generation of noise derived from impurities other than the detection target substance contained in the sample can be suppressed. When the detection target substance is detected using the antigen-antibody reaction, for example, the reagent to which an antibody is bonded is prepared in advance.

The removal section P2 of the extraction apparatus 50 and the reagent supply section 15 are arranged along a direction in which the detector 13 is displaced, that is, a rotation direction of the rotating surface 12s. For example, the removal section P2, the reagent supply section 15, and the optical measurement section 16 are arranged counterclockwise in this order (FIG. 15). The removal section P2, the reagent supply section 15, and the optical measurement section 16 may be arranged clockwise in this order. The removal section P2, the reagent supply section 15, and the optical measurement section 16 may be arranged counterclockwise or clockwise in the order of the reagent supply section 15, the removal section P2, and the optical measurement section 16.

The optical measurement section 16 is held by the holding base 17 together with the reagent supply section 15, for example, and measures the optical characteristics of the sample and the reagent supplied to the detector 13. The optical measurement section 16 is placed above the rotating surface 12s, and the detector 13 can be placed at a position facing the optical measurement section 16, that is, immediately below the optical measurement section 16. From a measurement result of the optical measurement section 16, the presence or the content of the detection target substance contained in the sample is detected.

For example, the optical measurement section 16 irradiates the detector 13 with light and detects the optical signal generated by the detector 13. The optical measurement section 16 includes, for example, an irradiator and a light receiver. The irradiator and the light receiver are placed, for example, at positions facing the rotating surface 12s.

The irradiator includes a light source, and emits light from the light source toward the detector 13. The light emitted from the irradiator to the detector 13 is, for example, light in a wavelength range capable of exciting the fluorescent substance. The light source is, for example, a lamp, an LED (Light Emitting Diode), a laser, and the like. The light generated by the light source may be monochromatic light or light having a wide wavelength band. When the light generated by the light source has a wide wavelength band, the irradiator preferably includes an optical filter such as a bandpass filter. When a lamp, an LED, or the like is used as the light source, the irradiator preferably includes a guide member that regulates a traveling direction of the light generated by the light source. The guide member is, for example, a collimating lens.

The light receiver includes, for example, an imaging device such as a photodiode, a photodetector, a CCD (Charge Coupled Device) image sensor, and a CMOS (Complementary Metal Oxide Semiconductor) image sensor. The photodetector is, for example, a photomultiplier tube or the like. A known imaging device can be used as the light receiver. The light receiver detects the light intensity or spectrum of light incident on the optical measurement section 16. The light receiver may detect the intensity of light having a single wavelength or may detect the intensity of light having a plurality of wavelengths. When the light emitted from the irradiator is incident on the detector 13, for example, the conjugate of the reagent and the detection target substance is excited by this light, generating an optical signal. The generated optical signal is directly incident on the light receiver, or is reflected at an interface between the transparent member 132 and the opaque member 131 to be incident on the light receiver.

The holding base 17 that holds the reagent supply section 15 and the optical measurement section 16 is placed above the support base 12, and a part of the holding base 17 faces the support base 12. A reagent holder 172 is provided on an upper surface of the holding base 17.

The reagent holder 172 is fixed to the upper surface of the holding base 17. The reagent holder 172 has, for example, a ring shape, and the reagent supply section 15 is held inside the reagent holder 172. The reagent supply section 15 is configured to be detachable from the reagent holder 172.

The waste liquid reservoir 19 placed below the support base 12 stores, for example, a waste liquid generated when the detector 13 is cleaned. For example, after the optical characteristics of the mixture of the sample and the reagent supplied to the detector 13 are measured, a cleaning liquid is supplied to the detector 13. The cleaning liquid is supplied to the detector 13, for example, through the receiving part 21. Together with the cleaning liquid supplied to the detector 13, the sample and the reagent in the flow path 132f are discharged to the waste liquid reservoir 19. The waste liquid is discharged to the waste liquid reservoir 19, for example, by sucking one end of the flow path 132f. By cleaning the detector 13 after measuring the optical characteristics as described above, the detector 13 can be reused. A cleaning liquid supply section (not illustrated) storing the cleaning liquid may be placed below the support base 12.

<Testing Method Using Testing System 1>

Figure 17:
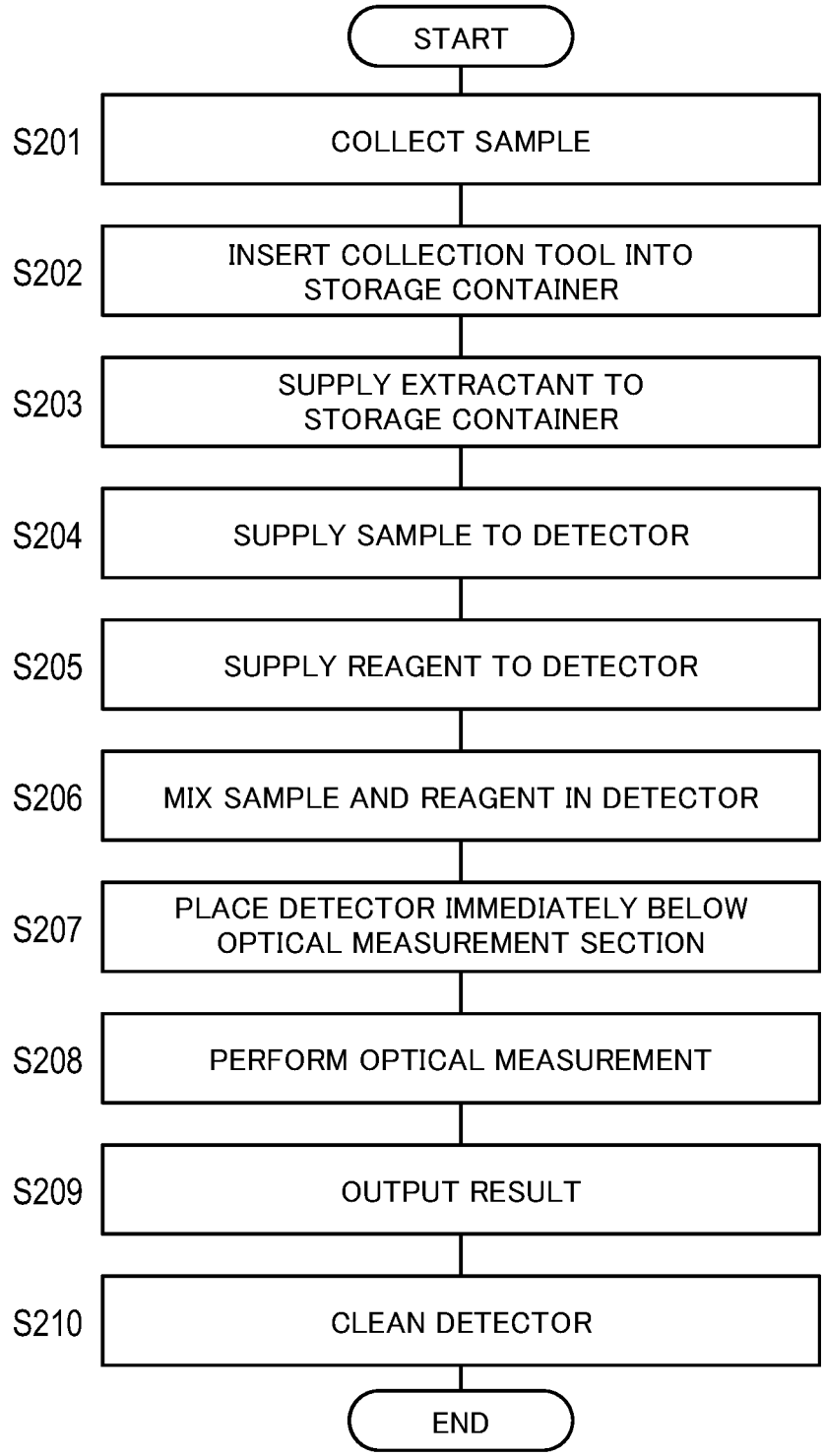
FIG. 17 is a flowchart illustrating an example of a testing method using the testing system illustrated in FIG. 1.

Hereinafter, a testing method using the testing system 1 of the present embodiment will be described with reference to FIG. 17. FIG. 17 is a flowchart illustrating an example of the testing method using the testing system 1.

First, the tester collects the sample from the subject using the collection tool C or the like (step S201). Specifically, the tester wipes saliva or nasal swabs from the pharynx, the nasal cavity, or the like of the subject using the collection tool C. The tester may be the subject himself/herself.

Next, the tester inserts the collection tool C to which the sample of the subject is attached into the storage container 500 through the supply section 100M (step S202). Thereafter, when the tester shields the supply section 100M with the shield 100S and inputs an instruction to the acceptor 562, the storage container holder 51 is displaced from the sample receiving section P1 to the removal section P2.

At the removal section P2, the discharge mechanism 53 of the extraction apparatus 50 supplies the extractant to the storage container 500 (step S203), and then causes the sample extracted into the extractant to be discharged from the discharge port 500D (step S204). As a result, the sample is supplied to the detector 13.

Subsequently, the tester rotates the rotating surface 12s to place the detector 13 immediately below a reagent supply port 15M, and then supplies a prescribed amount of reagent from the reagent supply section 15 to the detector 13 through the reagent supply port 15M (step S205).

Next, the tester mixes the sample and the reagent supplied to the detector 13 (step S206). For example, the tester mixes the sample and the reagent by performing reciprocating liquid feed in the flow path 132f. As a result, the conjugate of the reagent and the detection target substance contained in the sample is generated.

Next, the tester rotates the rotating surface 12s to place the detector 13 immediately below the optical measurement section 16 (step S207), and performs the optical measurement of the mixed sample and reagent (step S208). In the optical measurement, the optical measurement section 16 emits light toward the detector 13 and receives light incident on the optical measurement section 16 from the detector 13.

After performing the optical measurement of the detector 13, the tester outputs a result of the optical measurement (step S209). The result of the optical measurement is determined by, for example, image processing and is output.

Thereafter, the tester cleans the detector 13 (step S210). Cleaning of the detector 13 is performed, for example, as follows. First, the detector 13 is displaced to immediately above the cleaning liquid supply section by rotating the rotating surface 12s, and the cleaning liquid is supplied from the cleaning liquid supply section to the detector 13. Subsequently, the sample and the reagent in the flow path 132f are discharged to the waste liquid reservoir 19 together with the supplied cleaning liquid. The discharge to the waste liquid reservoir 19 may be performed after the detector 13 is displaced to immediately above the waste liquid reservoir 19. Subsequently, the rotating surface 12s is rotated to displace the detector 13 to immediately below the optical measurement section 16, and the optical measurement of the detector 13 is performed. Thereafter, the result of the optical measurement is output. When it is confirmed that the detector 13 has been cleaned, the cleaning is terminated. When the cleaning of the detector 13 is insufficient, the supply and discharge of the cleaning liquid to and from the detector 13 are repeated again.

After the detector 13 is cleaned, the detection is terminated. Alternatively, after the detector 13 is cleaned, the process may return to step S201.

Since the extraction apparatus 50 is used in the testing system 1, the tester can supply the sample extracted into the extractant to the detector 13 without touching the storage container 500. Therefore, it is possible to reduce the contamination of the storage container 500 caused when the tester inexperienced in handling the sample touches the storage container 500. The testing system 1 as described above enables, for example, the subject himself/herself to easily perform the test, and can be used for purposes other than medical examination. Examples of the application other than medical examination purposes include a test for entrance permission at a building entrance or the like.

Furthermore, in the testing system 1, the discharge port 500D and the reagent supply port 15M can be placed above the rotating surface 12s. Thus, by placing the detector 13 on the rotating surface 12s and rotating the rotating surface 12s, the detector 13 is displaced to immediately below each of the discharge port 500D and the reagent supply port 15M. Therefore, the sample and the reagent can be supplied to the detector 13 from each of the discharge port 500D and the reagent supply port 15M by the simple operation.

Hereinafter, a modification of the extraction apparatus 50 described in the above embodiment will be described. Note that detailed description of the same component as each component of the extraction apparatus 50 described in the above embodiment will be omitted in the following in order to avoid duplication of description.

Modification

Figure 18:
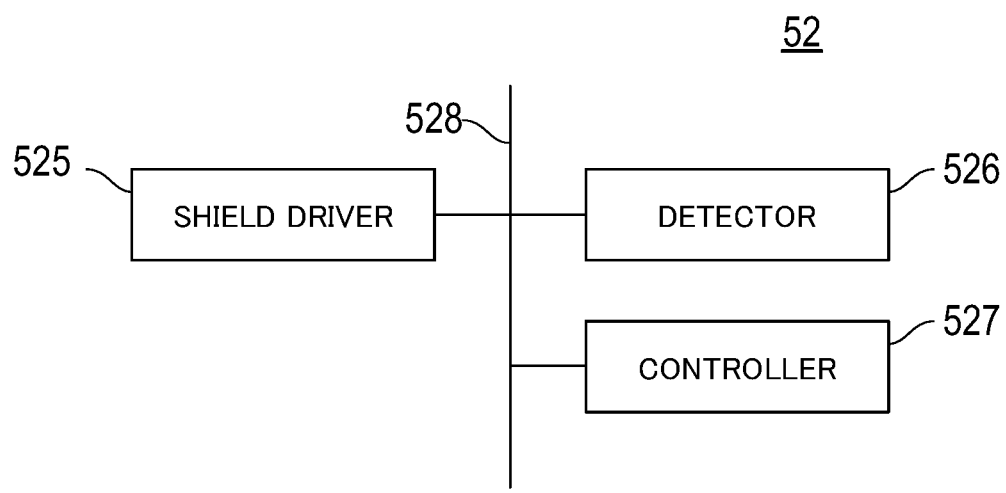
FIG. 18 is a block diagram illustrating a configuration example of an extraction apparatus according to a modification.

FIG. 18 illustrates a configuration of the supply mechanism 52 of the extraction apparatus 50 according to the modification. The supply mechanism 52 includes, for example, a shield driver 525, a detector 526, and a controller 527. The shield driver 525, the detector 526, and the controller 527 are connected to each other via, for example, a bus 528.

The shield driver 525 drives the shield 100S to shield and expose the supply section 100M. For example, the shield 100S is configured to be slidable, and the shield driver 525 shields and exposes the supply section 100M by sliding the shield 100S.

The detector 526 is a sensor that detects a person or an object present within a predetermined range from the supply section 100M. When detecting that a person, the collection tool C, or the like approaches the vicinity of the supply section 100M, the detector 526 transmits fifth detection information to the controller 527. The detector 526 is, for example, a motion sensor or the like placed near the supply section 100M. The detector 526 may be a camera or the like. Here, the detector 526 corresponds to a specific example of a third detector of the present invention.

The controller 527 includes one or a plurality of CPUs, and executes various processes in accordance with a computer program. Based on the fifth detection information transmitted from the detector 526, the controller 527 transmits an instruction to the shield driver 525 to expose the supply section 100M. As a result, the tester can insert the collection tool C into the storage container 500 through the exposed supply section 100M. For example, when determining that no person nor object exists within a predetermined range from the supply section 100M based on the information transmitted from the detector 526, the controller 527 transmits an instruction to the shield driver 525 to shield the supply section 100M.

The extraction apparatus 50 including the supply mechanism 52 as described above is also configured such that the storage container holder 51 can be placed at the sample receiving section P1, and the supply section 100M of the housing 100 is provided in a portion corresponding to the sample receiving section P1, similarly to the above embodiment. Therefore, it is possible to reduce contamination of the storage container 500 caused when a tester inexperienced in handling the sample touches the storage container 500. In addition, in the extraction apparatus 50, since the supply section 100M is shielded and exposed without the tester touching the shield 100S, the occurrence of infection via the shield 100S can be suppressed.

As described above, the extraction apparatus and the testing system of the present invention have been described in the embodiment. However, it goes without saying that additions, variations, and omissions can be made as appropriate in the present invention by those skilled in the art within the scope of the technical idea.

For example, the controllers 523, 535, 546, 554, and 563 described in the above embodiment may be configured by one CPU, and the detectors 522, 534, 545, and 553 may be configured by one sensor.

In the above embodiment, the example has been described in which the storage container holder 51 is displaced to each position when the tester inputs an instruction via the acceptor 562. However, the extraction apparatus 50 may detect the termination of each operation at the sample receiving section P1, the removal section P2, the disposal preparation section P3, and the installation section P4 to displace the storage container holder 51.

In the above embodiment, the example has been described in which the sample is removed at the removal section P2 by discharging the sample from the storage container 500. However, the sample may be removed at the removal section P2 by sucking up the sample from the storage container 500 using a pipette or the like.

In the above embodiment, the example in which the sample attached to the collection tool C is supplied to the storage container 500 has been described, but the sample may be directly supplied to the storage container 500. In addition, the sample may be removed from the storage container 500 at the removal section P2 without supplying the extractant to the storage container 500.

In the above embodiment, the example in which the sample is a sample collected from a living body has been described, but the sample may be a sample other than the biological sample, such as wastewater.

In the above embodiment, the example has been described in which the sample receiving section P1, the removal section P2, the disposal preparation section P3, and the installation section P4 are placed at different positions from each other in the housing 100. However, some or all of them may be placed at the same position in the housing 100.

In the above embodiment, the example has been described in which the storage container 500 is held by the storage container holder 51 in the housing 100. However, the storage container 500 may be held in the housing 100 while moving from the storage container holder 51 to another member or from another member to the storage container holder 51.

In the above embodiment, the example has been described in which the detector 13 after the optical measurement is performed is cleaned and the detector 13 is reused, but the detector 13 may be replaced with a new detector 13 every time the optical measurement is performed. At this time, the testing apparatus does not have to be provided with the waste liquid reservoir.

In the above embodiment, the example has been described in which both the irradiator and the light receiver of the optical measurement section 16 are provided above the rotating surface 12s, but the irradiator and the light receiver of the optical measurement section 16 may be provided at other positions. For example, the irradiator may be provided above the rotating surface 12s, and the light receiver may be provided below the rotating surface 12s.

In addition, in the above embodiment, the example in which the sample is saliva or nasal swabs has been described. However, the sample may be anything containing the detection target substance, and may be, for example, blood, urine, and the like. Moreover, the extraction apparatus 50 may extract a substance other than the sample, and may extract, for example, chemicals, environmental water, clean water, sewage, and the like.

Furthermore, the operation of the extraction apparatus 50 and the testing method of the testing system 1 described above may include steps other than the steps in the above-described flowcharts, or may not include part of the above-described steps. Additionally, the order of the steps is not limited to that of the above embodiment.

Although embodiments of the present invention have been described and illustrated in detail, the disclosed embodiments are made for purpose of illustration and example only and not limitation. The scope of the present invention should be interpreted by terms of the appended claims.

What is claimed is:

1. A sample removal apparatus for removing a sample stored in a conical storage container, the sample removal apparatus comprising:
   a storage container holder that holds said storage container, said storage container holder including a circular hole into which the conical storage container is fitted, said storage container holder being configured to be axially rotatable about a shaft-shaped member to one or more of a sample receiving section, a removal section, a disposal preparation section, and an installation section;
   the removal section that removes said sample stored in said storage container from said storage container, said removal section includes covering an insertion port of the conical storage container with a lid and a discharge mechanism configured to remove the sample stored in the conical storage container through a discharge port on an apex side of the insertion port of the conical storage container to a predetermined place;
   a housing that covers said storage container holder and said removal section; and
   a supply section that allows for supply of said sample from outside of said housing to said storage container in said housing via an opening in the housing.

2. The sample removal apparatus according to claim 1, further comprising a second detector that detects that said storage container holder is placed at a position close to said supply section.

3. The sample removal apparatus according to claims 1, further comprising a third detector that detects a person or an object present within a predetermined range from said supply section.

4. The sample removal apparatus according to claim 1, wherein a collection tool to which said sample is attached is supplied from the outside of said housing to said storage container through said supply section.

5. The sample removal apparatus according to claim 1, wherein said storage container holder holds said single storage container.

6. The sample removal apparatus according to claim 1, wherein said sample is extracted into an extractant at said removal section removes.

7. The sample removal apparatus according to claim 6, further comprising an extractant reservoir that stores said extractant, wherein
   said extractant is supplied from said extractant reservoir to said storage container.

8. The sample removal apparatus according to claim 1, wherein said sample is removed by causing to be discharged from said storage container at said removal section.

9. The sample removal apparatus according to claim 8, further comprising a discharge accelerator that causes said sample to be discharged from said storage container at said removal section.

10. The sample removal apparatus according to claim 1, further comprising a standby section that causes said empty storage container to stand by.

11. The sample removal apparatus according to claim 10, further comprising a pair of rotating members rotatably held and having a recess to engage with a flange provided in said storage container, wherein
said standby section is provided between said pair of rotating members.

12. The sample removal apparatus according to claim 10, wherein said standby section is provided above said storage container holder.

13. The sample removal apparatus according to claim 1, wherein said supply section is an opening provided in said housing.

14. The sample removal apparatus according to claim 13, further comprising a shield capable of shielding said opening.

15. The sample removal apparatus according to claim 14, further comprising a lock member that fixes said shield at a position to shield said opening.

16. The sample removal apparatus according to claim 14, further comprising a first detector that detects shielding and exposure of said opening by said shield.

17. The sample removal apparatus according to claim 1, wherein said sample is supplied from the outside of said housing to said storage container held by said storage container holder through said supply section.

18. The sample removal apparatus according to claim 17, wherein said storage container holder is configured to be placeable at a sample receiving section where said sample is supplied to said storage container, and said removal section.

19. The sample removal apparatus according to claim 18, further comprising a displacement mechanism that places said storage container holder at said sample receiving section and said removal section.

20. The sample removal apparatus according to claim 19, further comprising a support that turnably supports said storage container holder, wherein
said displacement mechanism includes a driver that axially rotates said support.

21. The sample removal apparatus according to claim 18, wherein said storage container holder is further configured to be placeable at an installation section where said storage container that is empty is installed in said storage container holder, and a disposal preparation section where said storage container is disposed of from said storage container holder to a disposal section.

22. The sample removal apparatus according to claim 21, wherein said disposal section is provided below said storage container holder.

23. The sample removal apparatus according to claim 21, further comprising a disposal mechanism that guides said storage container to said disposal section.

24. The sample removal apparatus according to claim 23, wherein said disposal mechanism includes
a pushup member that is configured to be movable in a vertical direction and pushes up said storage container placed at said disposal preparation section, and
a guide member that guides said storage container pushed up by said pushup member to said disposal section by causing said storage container to follow said guide member.

25. A testing system comprising:
a sample removal apparatus for removing a sample stored in a storage container, the sample removal apparatus including a storage container holder that holds said storage container, a removal section that removes said sample stored in said storage container from said storage container, a housing that covers said storage container holder and said removal section, and a supply section that allows for supply of said sample from outside of said housing to said storage container in said housing,
a detector that receives said sample removed by said removal section;
a reagent supply section that supplies a reagent to said detector; and
an optical measurement section that measures optical characteristics of said sample and said reagent supplied to said detector.

26. A testing system comprising:
a conical storage container configured to store a sample;
a storage container holder that holds said storage container, said storage container holder including a circular hole into which the conical storage container is fitted, said storage container holder being configured to be axially rotatable about a shaft-shaped member to one or more of a sample receiving section, a removal section, a disposal preparation section, and an installation section; and
wherein the removal section is configured to remove said sample stored in said storage container from said storage container, said removal section includes covering an insertion port of the conical storage container with a lid and a discharge mechanism configured to remove the sample stored in the conical storage container through a discharge port on an apex side of the insertion port of the conical storage container to a predetermined place.

* * * * *